Oct. 10, 1967  R. A. KOSTER ETAL  3,346,853

CONTROL/DISPLAY APPARATUS

Filed March 2, 1964  15 Sheets-Sheet 1

INVENTORS
ROBERT A. KOSTER
FRANK J. BEACH
ROLAND F. BRYAN
BY Allen M. Dutton
Arthur Freilich
ATTORNEYS

DISPLAY STATE COUNTER

CURSOR MODE SW 01

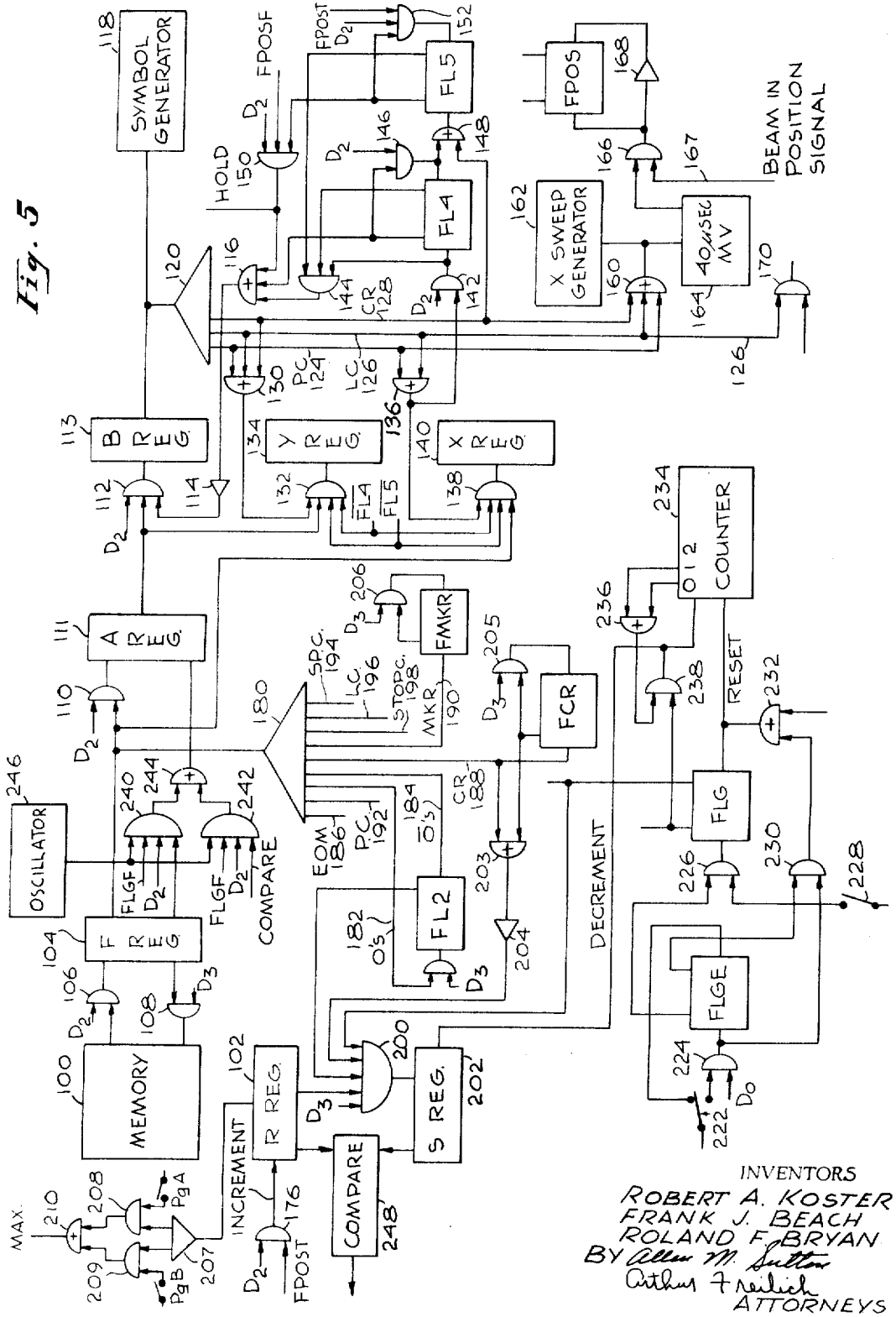

CHANGE LINE SEGMENT SW 02

CLEAR MEMORY SW 03 SW 11

CURSOR X ONLY SW 04

INVENTORS
ROBERT A. KOSTER
FRANK J. BEACH
ROLAND F. BRYAN
BY
ATTORNEYS

Fig. 10 CURSOR Y ONLY SW05
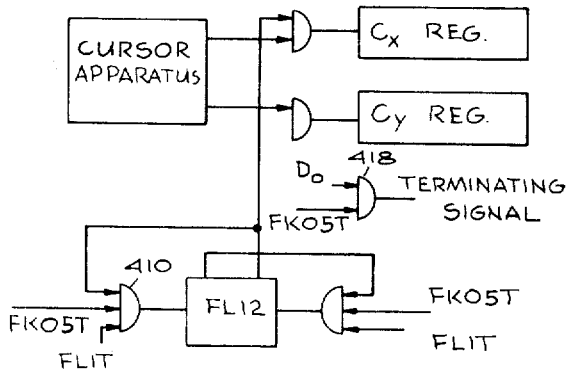
Fig. 11 CLEAR ALARM SW06
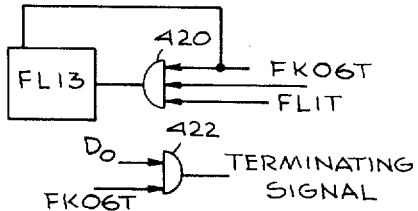
Fig. 14 DELETE WORD SW09
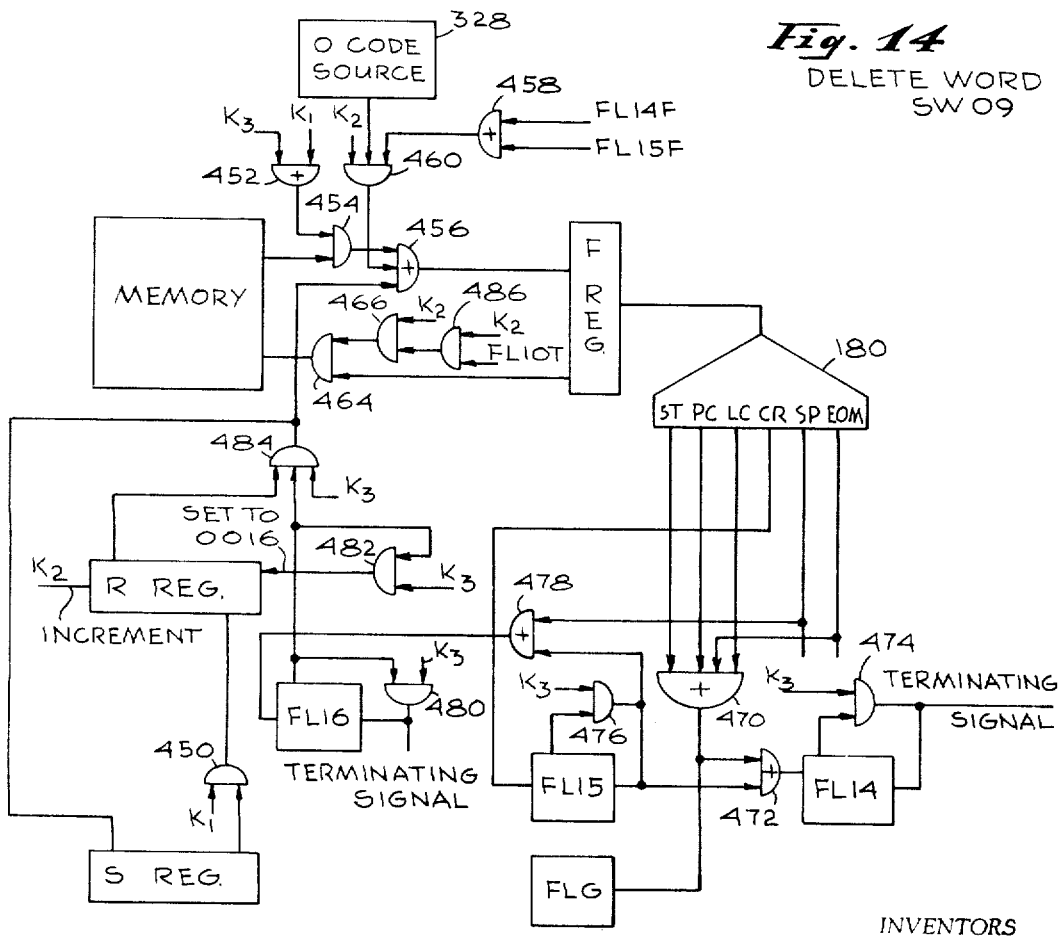
INVENTORS
ROBERT A. KOSTER
FRANK J. BEACH
ROLAND F. BRYAN
BY
ATTORNEYS Oct. 10, 1967   R. A. KOSTER ET AL   3,346,853
CONTROL/DISPLAY APPARATUS
Filed March 2, 1964   15 Sheets-Sheet 7

CLEAR BLINK SW07

DELETE LINE SEGMENT SW08

DELETE LINE TEXT SW10

INVENTORS
ROBERT A. KOSTER
FRANK J. BEACH
ROLAND F. BRYAN
BY
ATTORNEYS

CLEAR MEMORY TEST SW 11

COPY WORD SW 12

COPY LINE
SW 13

ADVANCE MARKER
SW 14

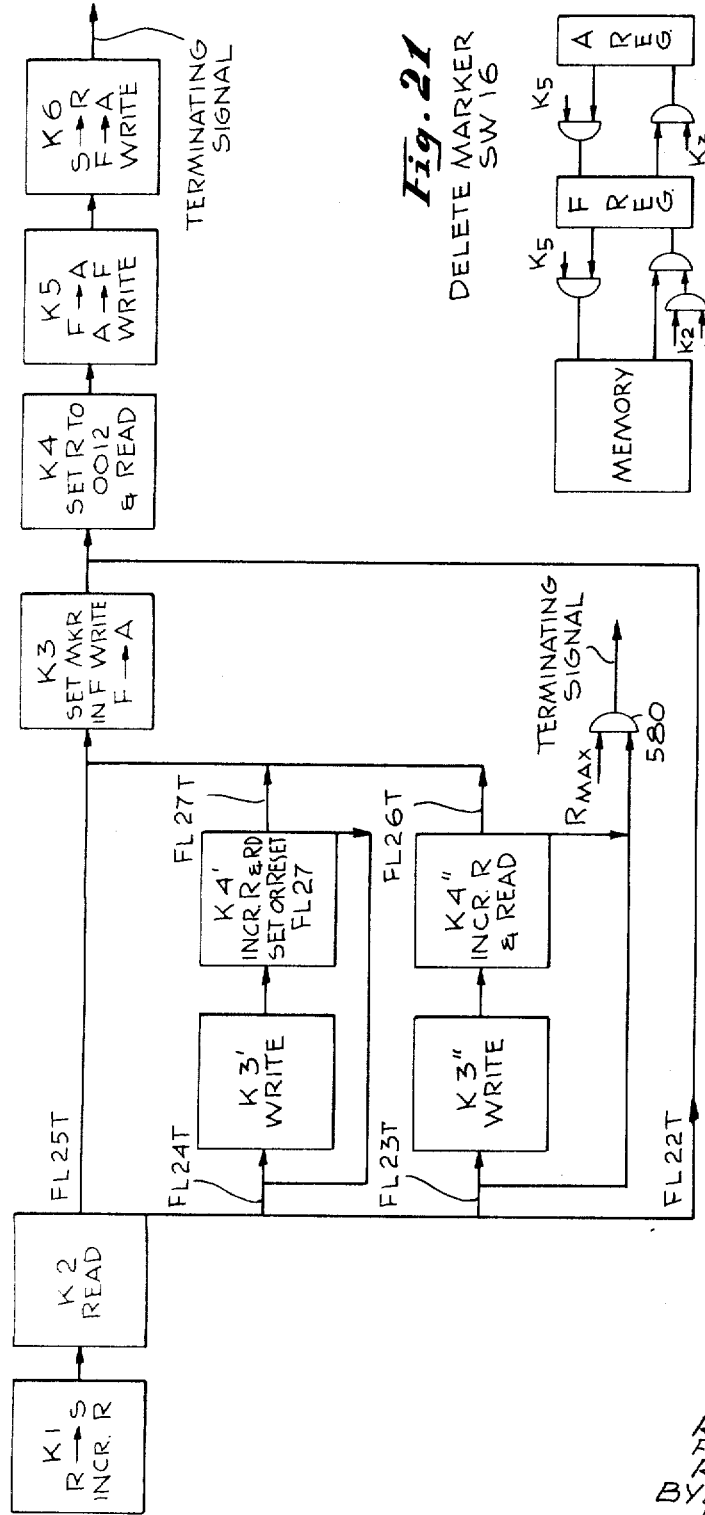
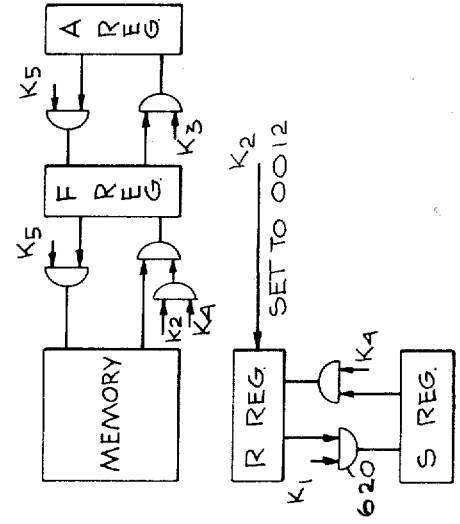

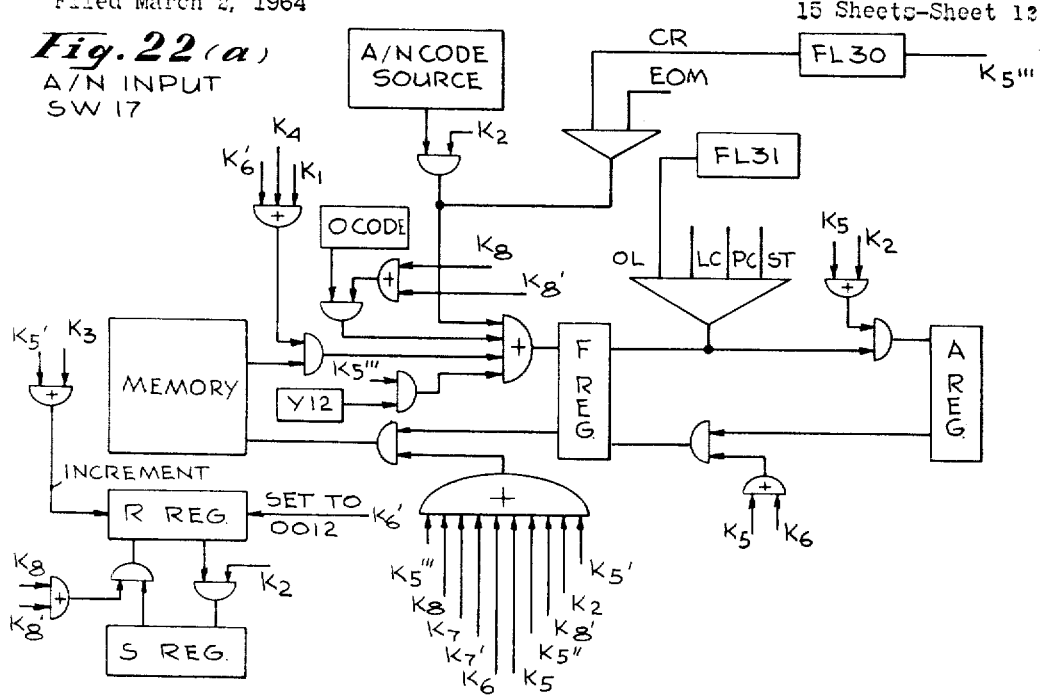

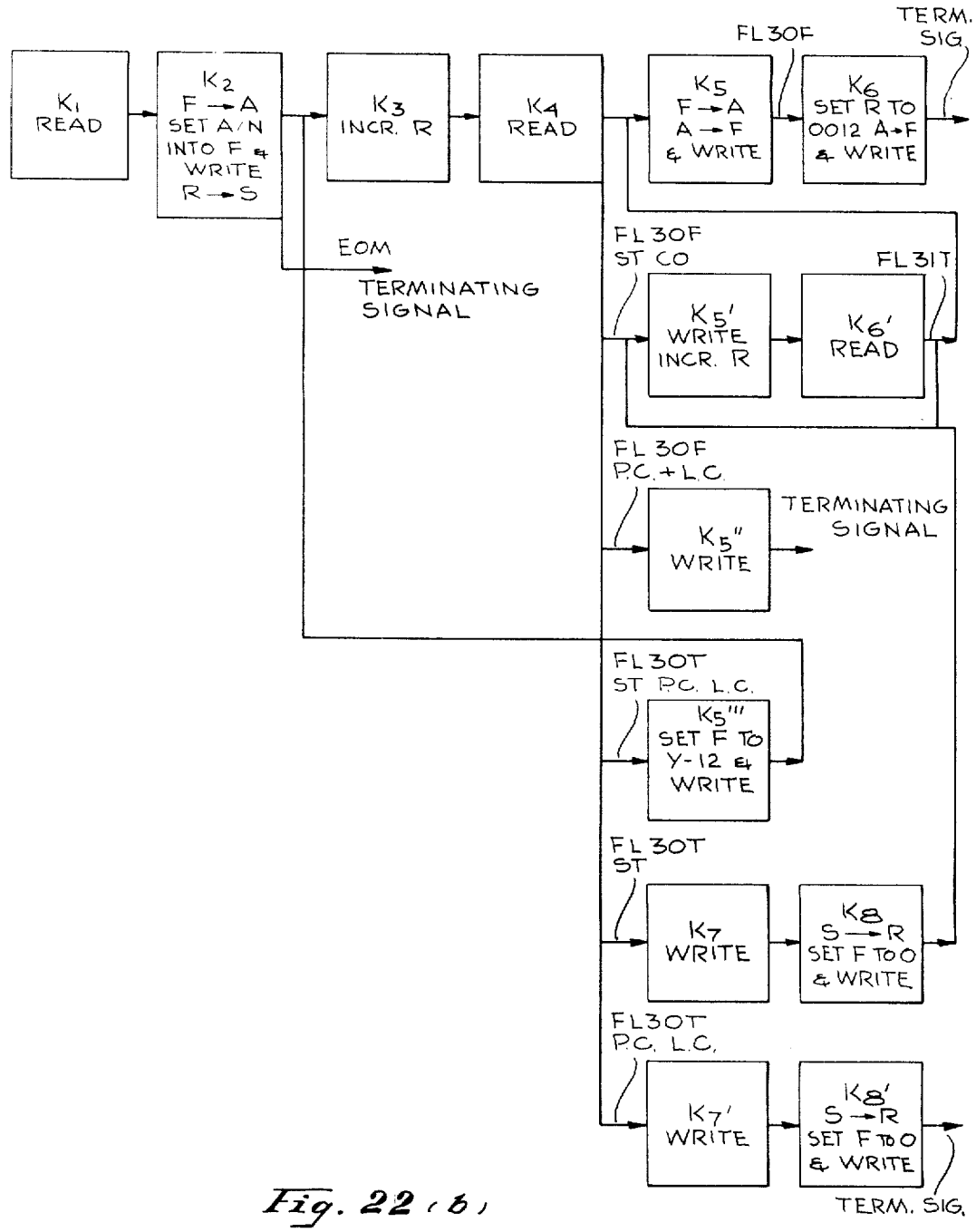

CREATE MKR BY CURSOR SW 18

DRAW LINE SEGMENT SW 19

CREATE PLOT SYMBOL SW 20

INVENTORS
ROBERT A. KOSTER
FRANK J. BEACH
ROLAND F. BRYAN
BY
ATTORNEYS

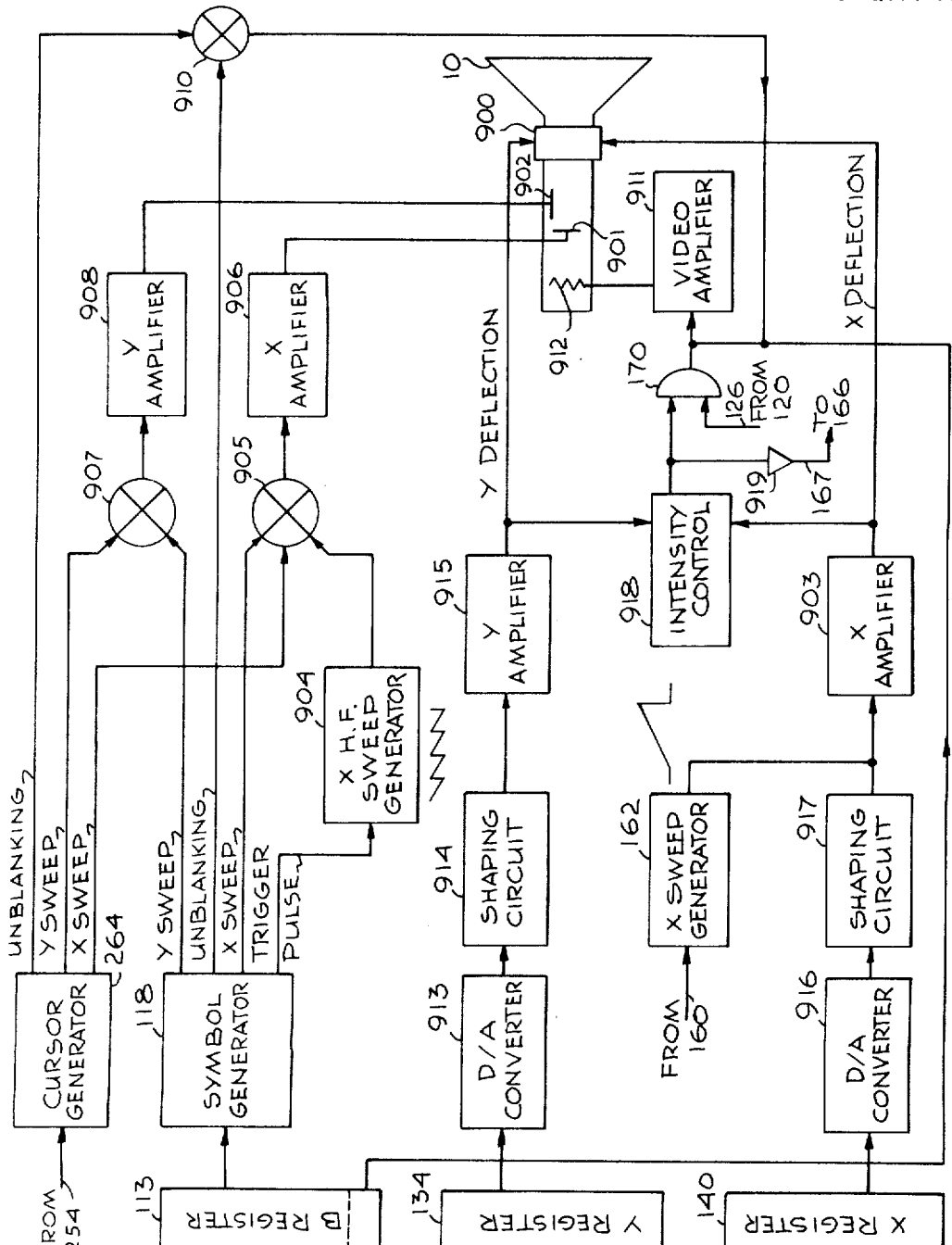

United States Patent Office 3,346,853
Patented Oct. 10, 1967

3,346,853
CONTROL/DISPLAY APPARATUS
Robert A. Koster, Frank J. Beach, and Roland F. Bryan, Canoga Park, Los Angeles, Calif., assignors, by mesne assignments, to The Bunker-Ramo Corporation, Stamford, Conn., a corporation of Delaware
Filed Mar. 2, 1964, Ser. No. 348,430
30 Claims. (Cl. 340—172.5)

This invention relates to computer input-output apparatus, and, more particularly, to control/display apparatus for use with a digital computer.

It is well known that conventional input-output devices for computers operates at speeds many times slower than the computers themselves. Such conventional devices have placed severe limitations on the uses to which high-speed computers may be put. For example, the need to wait to print out requested or required information has posed a serious problem in the use of computers in space technology. It is highly desirable, for example, to have the analysis of data about the performance of a space vehicle or the condition of an astronaut continuously available to scientists from a computer into which the data is fed. The speed at which the data analysis may be made available to the scientists by means of conventional printout devices is unsatisfactorily slow.

Most conventional output devices provide data in the form of words or figures, which in many cases may be difficult for the human mind to assimilate. For example, if data concerning an astronaut's blood pressure is being supplied, it may be far more meaningful to show it in the form of a graph than in the form of figures, so that rates of increase or decrease may be easily seen. However, conventional plotting equipment that might be used with a digital computer suffers from the same speed limitation as other output equipment.

Conventional computer input-output equipment suffers from a further disadvantage in that it does not readily permit an operator to alter or edit information stored in the computer memory, or even to enter new information into the memory. Furthermore, errors may be made when entering information by means of coding devices, such as punched paper tape or punched cards, which are not apparent to the computer operator and which may lead to completely unreliable output information being provided by the computer.

The present invention provides a control/display apparatus for use with a digital computer, which obviates the foregoing disadvantages of input-output apparatus heretofore known. The apparatus of the invention displays virtually instantaneously data provided by the computer. It can be used to create new data for entry into the computer, to delete data from the computer memory, and to alter or edit data stored in the computer memory.

The present invention is based on the realization that for control/display apparatus to attain true versatility and maximum utility it must embody its own memory into and out of which large blocks of data can be transferred at high speed to and from a digital computer. The apparatus embodies logic circuitry to enable data stored in its memory to be visually presented on display means such as a cathode ray tube. The display can consist of symbols and alphanumeric data as well as graphic data, including plotted symbols, straight line drawings, graphs and charts. As used herein, the terms "symbol" and "symbolic" are taken to include alphanumeric symbols, and the term "graphic" is taken to include plotted symbols and line drawings. Whatever data is stored in the memory of the apparatus is cyclically presented on the display means and the logic circuitry of the apparatus premits an operator to perform various off-line editing operations on that data.

It is specifically pointed out that both the digital computer and the control/display apparatus have their own memories which communicate with each other only in response to certain operations. In normal operation, the memory locations of the control/display apparatus memory are accessed sequentially, and each location can contain any one of various codes including symbol-identy-codes, display position codes, and various operating codes.

Various means are provided for identifying data that is to be edited or otherwise operated on and for identifying positions on the display at which new data is to be entered. For example, by using a light gun (a hand-held photoelectric device), the operator can identify data for use by the computer programs. Similarly, the light gun can be used to identify data that is to be edited off-line. A marker (a small arrow pointing downwardly) appears on the display under the control of the operator to indicate where new data is to be entered. A cursor (electronically generated cross hairs) is utilized to record in memory coordinates between which straight lines are to be drawn. The cursor and an alphanumeric typewriter-like keyboard are used in creating displays.

One of the principal features of the apparatus of the invention is that it provides means for visually identifying on the display that data which is to be operated on before the operation is performed. Thus, if the operator desires to clear a certain block of information from the memory, that information may be visually identified on the display before it is cleared from memory. After the information is cleared, new information may be entered into the memory through the alphanumeric keyboard and that new information will then appear on the display.

Another feature of the apparatus enables the operator to copy words or lines of text from one display (and memory) location to another. After the information has been copied, it may be deleted from its first location and new information substituted therefor. Thus, the apparatus embodies message-composing capability, an exceedingly useful tool for a computer operator.

As is apparent from the foregoing explanation, the control/display apparatus of the invention provides vastly improved means of communication between an opeartor and a digital computer over that heretofore obtainable. Further features and advantages of the invention will become apparent from the following description, taken in conjunction with the accompanying drawings, in which:

FIG. 5 is a diagram of the digital circuitry that is active during a display cycle for causing the contents of the apparatus memory to be displayed;

FIGS. 9 and 10 are diagrams of the logic circuitry involved in cursor X only and cursor Y only, respectively, modes of operation;

FIG. 11 is a diagram of the logic circuitry that is operative in a clear alarm operation;

FIG. 14 is a diagram of the logic circuitry operative in a delete word operation;

Figure 19A:
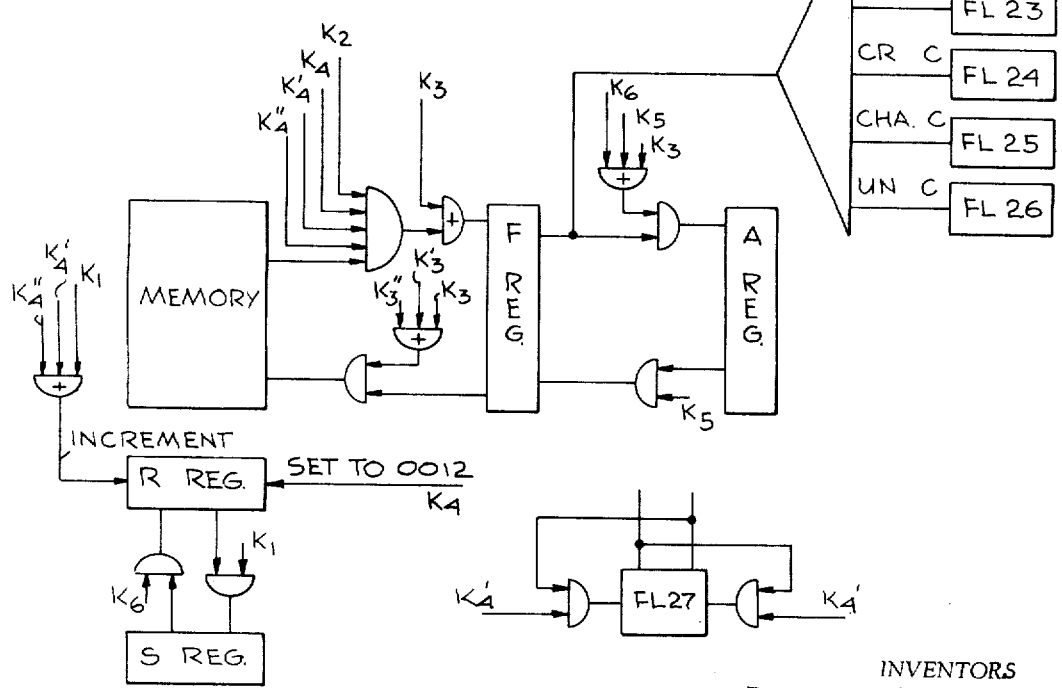
Figure 20A:
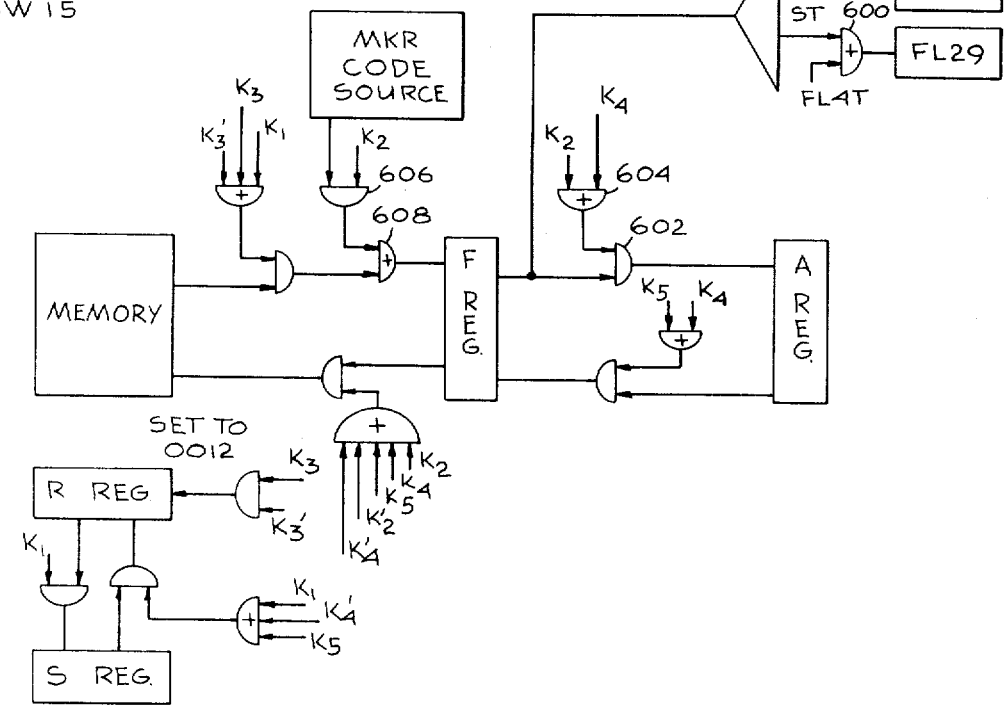
Figure 20B:
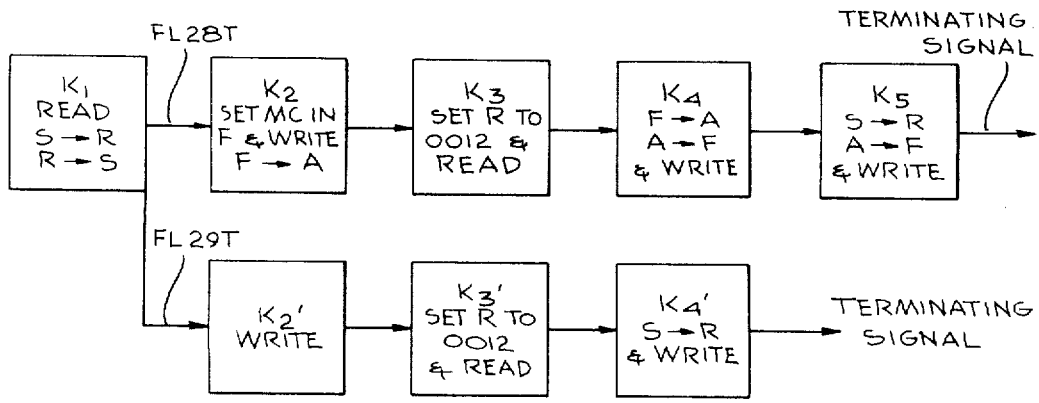
Figure 24:
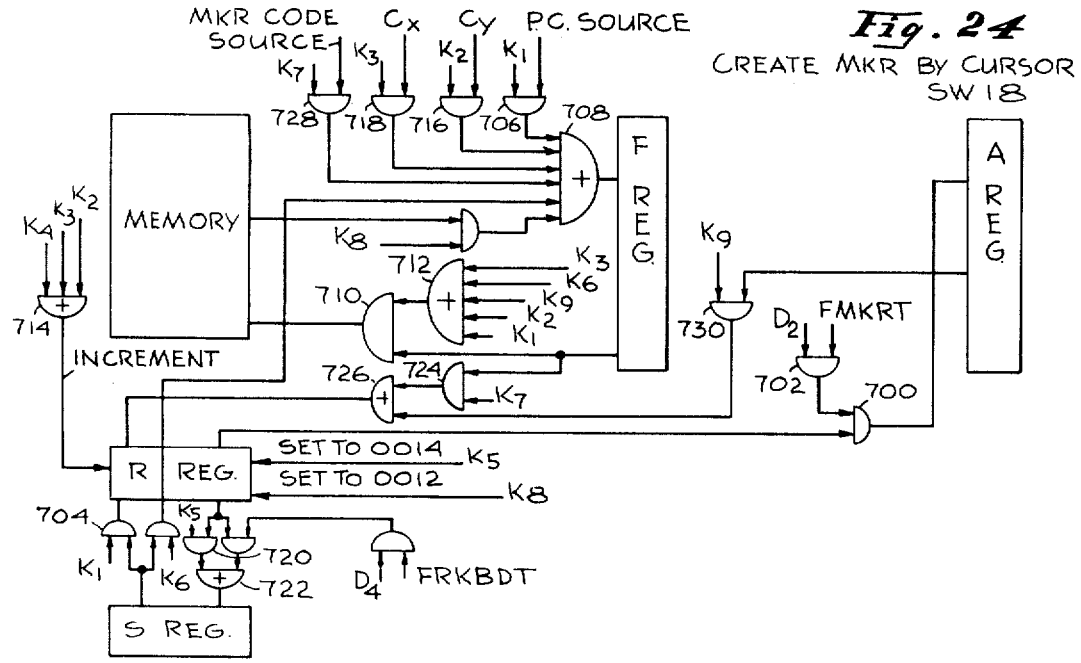
Figure 25:
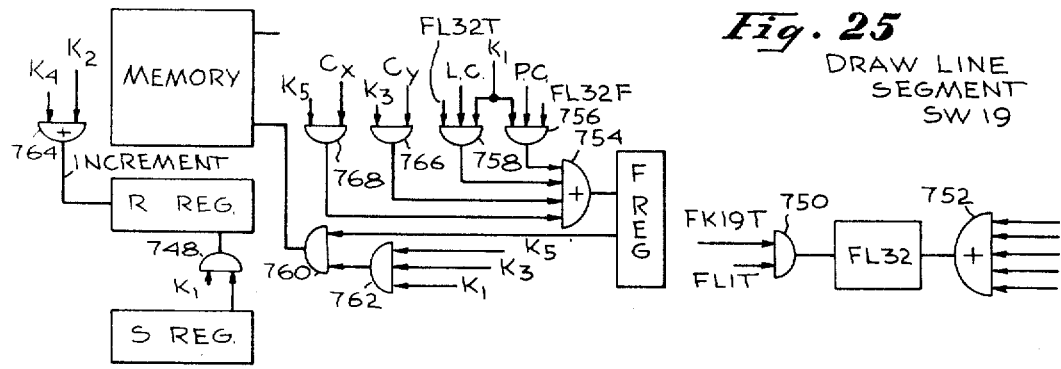
Figure 26:
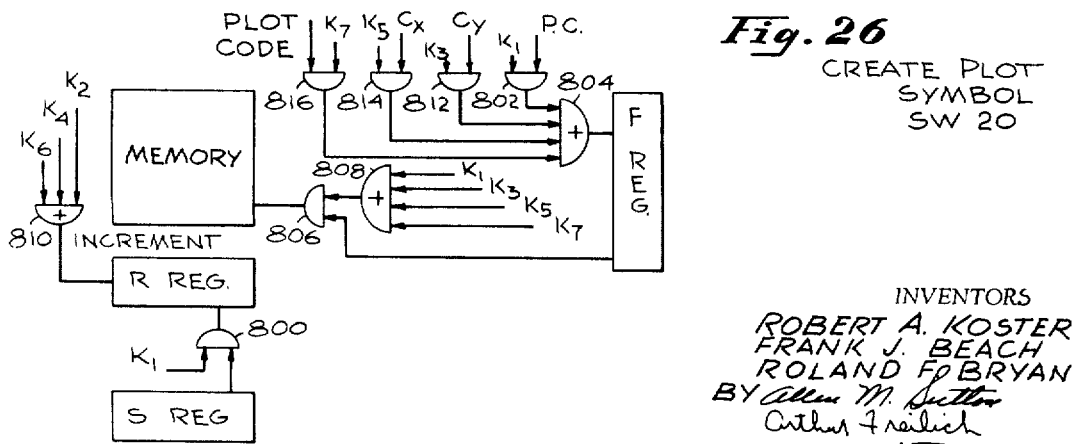

FIGS. 19(a) and (b) are a circuit diagram and a flow chart, respectively, of the logic involved in an advance marker operation;

FIGS. 20(a) and (b) are a circuit diagram and a flow chart, respectively, of the logic involved in a back space marker operation;

FIG. 21 is a diagram of the logic circuitry that is operative in a delete marker mode of operation;

FIGS. 22(a) and (b) are a circuit diagram and a flow chart, respectively, of the logic involved in an alphanumeric input operation;

FIG. 23 is a diagram of the logic circuitry involved in a create marker mode of operation;

FIG. 24 is a diagram of the logic circuitry involved in another create marker mode of operation;

FIG. 25 is a diagram of the logic circuitry operative in a draw line segment mode of operation;

FIG. 26 is a diagram of the logic circuitry involved in a create plot symbol mode of operation; and FIG. 27 is a block diagram of the anlog circuitry embodied in the apparatus of the invention.

Figure 1:
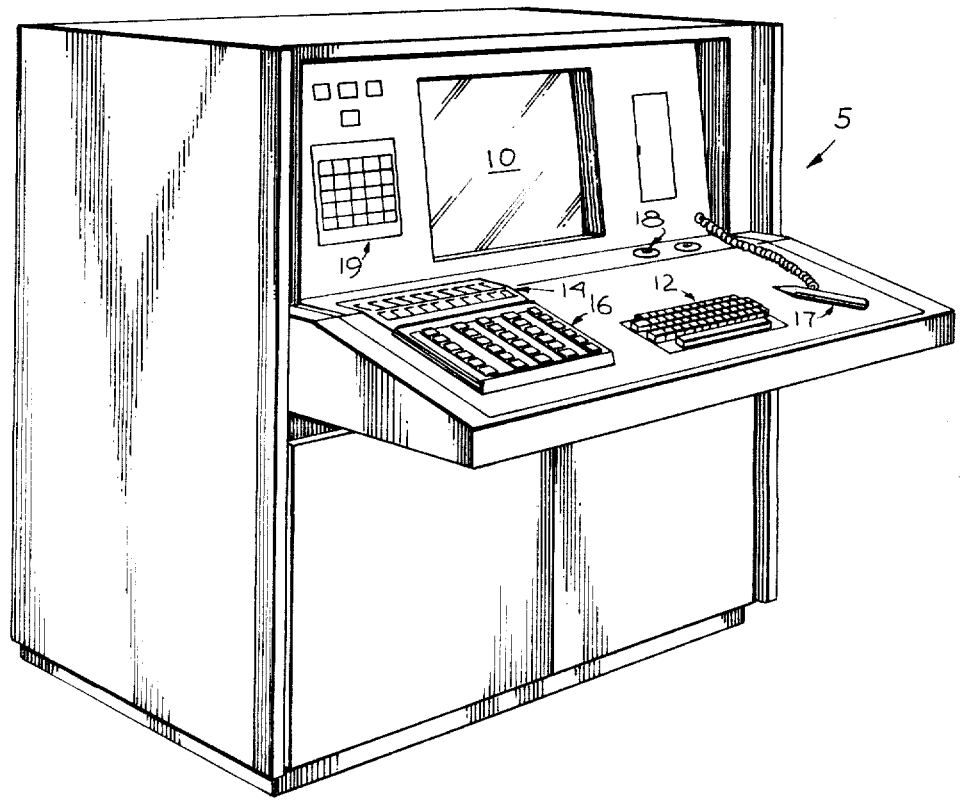
FIGURE 1 is a perspective view of a console forming part of the apparatus of the invention.
Figure 2:
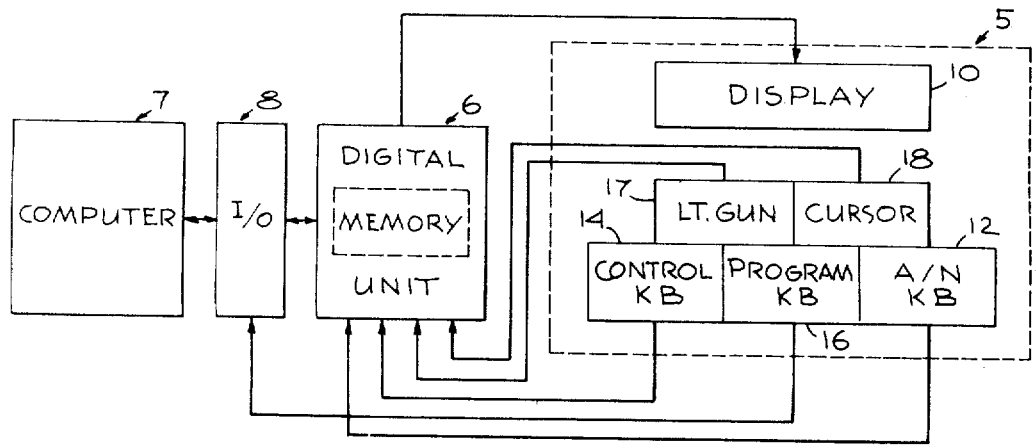
FIG. 2 is a generalized block diagram of the apparatus.

Physically, the apparatus of the invention may be housed in two cabinets, one of which is an operator's console 5 shown in FIG. 1. The other cabinet houses a digital unit 6, shown only in block form in FIG. 2. The console 5 is coupled directly to the digital unit 6 and a digital computer 7 may be coupled through input-output equiment 8 to the digital unit. The digital unit 6 includes logic circuitry and a digital memory in which can be stored both symbol and control information which is provided to the console 5. Symbol information is displayed by the console 5 on display means such as a cathode ray tube 10 and control information is utilized to control the beam in the cathode ray tube. The computer 7 is capable of communicating with the digital unit for modifying information stored in the memory thereof.

The console 5, in addition to including apparatus having display capabilities, is provided with a plurality of keyboards including an alphanumeric keyboard 12, a control keyboard 14, and a program keyboard 16. Each of these keyboards is under the control of a system operator. The program keyboard 16 is connected to the input-output equipment 8 and enables the system operator to selectively initiate operations in the computer 7. The alphanumeric and control keyboards 12 and 14 enable an operator to selectively initiate operations with respect to information stored in the digital unit memory which operations affect the visual display presented to the operator. The console 5 further includes a light gun apparatus 17 and a cursor apparatus 18, which are under the control of the operator to enable him to respectively identify to the digital unit memory locations and specific points on the display cathode ray tube face. Also, a bank of status lights 19 is provided on the front of the console 5, which lights are controlled by the computer and will not be discussed in detail.

The program keyboard 16, which is connected to the computer 7, through the input-output equipment 8, enables the console operator to initiate certain predetermined routines and sub-routines in the computer. The keyboard may be provided with a plurality of plastic overlays each one of which, when placed on the keyboard, actuates a combination of switches (not shown) to identify a particular routine in the computer. The keyboard keys project through openings in the overlay, and each key identifies a particular sub-routine of the routine identified by the overlay. Labels for the keys may be printed on the overlay adjacent each key. Thus, if a plurality of overlays are provided, many computer functions can be defined.

Suitable program keyboard arrangements are described in application Ser. No. 109,372, now Patent No. 3,187,321, filed May 11, 1961 by Stanley L. Kameny and entitled "Input/Output Device" and in application Ser. No. 293,529, filed July 8, 1963 by Irving H. Alexander and entitled "Control Device," both applications being assigned to the same assignee as the present invention. Inasmuch as the program keyboard communicates only with the computer and does not directly control any functions of the control/display apparatus, it will not be further described.

Although such devices are well known in the art, it might be well to consider briefly the light gun apparatus 17, which is used by the operator to identify memory locations of displayed data. The light gun is a wand-like device which is adapted to be held by the console operator and aimed at a target appearing on the cathode ray tube face. The light gun contains a photocell that emits a signal when it is illuminated. The targets, which may be lines, spots or symbols, appear to the eye to be continuously illuminated, but actually they are illuminated many times per second for very short intervals (a few microseconds) each time, and in a fixed sequence. Thus, when the light gun is aimed at a target and a pulse is emitted when the target is illuminated, the target can be identified by comparing the timing of the pulse with the sequence in which the targets are illuminated. If more than one target is visible to the photocell, usually only the first-illuminated target will be identified.

In the present case, when the operator desires to use the light gun, he first enables it by closing a switch mounted thereon, which sets a light gun enable flip-flop FLGE. Then, when a pulse is emitted by the light gun, it sets a light gun flip-flop FLG to identify the target. Functions of the flip-flops FLGE and FLG will be later described in detail.

The cursor apparatus 18 comprises a ball mounted in the console with the upper portion of the ball extending outwardly through the console surface so that the ball may be rotated by the operator. As the ball is rotated, its movement is resolved into X and Y coordinates, which control the position of the electronically generated cursor on the display cathode ray tube. The computer may read the coordinates of the position of the cursor at any time and use them as part of a data input or request.

The alphanumeric keyboard 12 allows the operator to enter alphanumeric information into the control/display apparatus memory. The keyboard is enabled whenever a marker symbol (arrow) is displayed on the cathode ray tube. It indicates where the next symbol will be displayed on the screen and is automatically advanced as the operator uses the typewriter-like keyboard. A "space" bar and "carriage return" key have functions similar to those of an ordinary electric typewriter. Actuation of the "carriage return" key causes the marker to move to a position immediately under the first symbol in the previous line. "Backspace marker" and "advance marker" keys allow the operator to move the marker through the text without destroying it, if he wishes to make a correction. In addition, an "end-of-message" key is provided to signify that the message being typed is complete.

Actuation of each of the alphanumeric keys, the "carriage return" key and the "end-of-message" key causes a unique digital code to be entered into the memory of the apparatus. Actuation of the "advance marker" and "backspace marker" keys cause logic sequences to take place that are similar to those caused by actuation of the keys of the control keyboard 14. Hence, the operation of those two "marker" keys will be described in connection with and as though they were part of the control keyboard.

Figure 3:
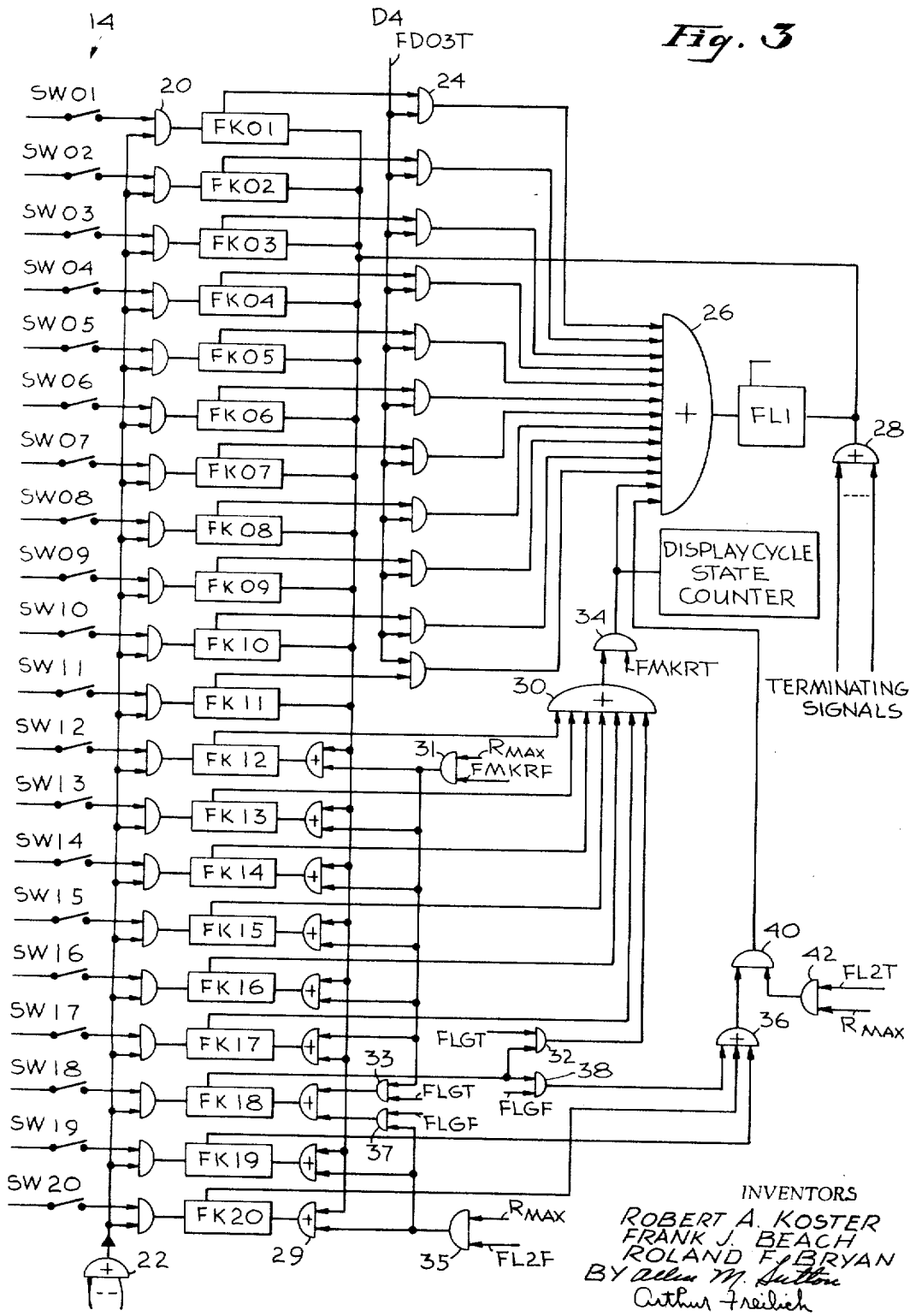
FIG. 3 is a diagram of the control keyboard and a portion of the circuitry which it controls.

Attention is now called to FIG. 3 which diagrammatically illustrates the control keyboard 14 together with apparatus responsive thereto. It is well to point out at this point that in the normal operation of the system of FIG. 2, a display operation is cyclically performed in which the contents of the digital unit memory locations are sequentially accessed and supplied to the console for generating a visual display. More particularly, in the absence of the actuation of any of the keys on the various keyboards, the system will function merely to display that information which is stored in the digital unit memory. Inasmuch as a cathode ray tube is contemplated for use as the display device, the information displayed thereby must be continually refreshed and consequently requires that the memory be completely accessed every certain interval.

As noted, both symbol and control words are stored in the memory locations, each word being represented by a different digital code. The total number of symbols which can be displayed by the console cathode ray tube will be assumed to be 64 and will include alphabetic, numeric and other symbols. In order to represent 64 different symbols, 64 different codes must be defined which requires the utilization of words at least six bits in length. Amongst the various other symbols which can be displayed, the marker and underline symbols are of particular interest and are mentioned at this point for the purpose of indicating that the codes representative of these symbols are utilized in the course of controlling the data display by operation of the control keyboard.

The control codes which can be stored in memory include the following (1) position code, (2) coordinate data code, (3) line code, (4) carriage return code, (5) type code, (6) space code, (7) end-of-message code, (8) stop code, and (9) plot code. Although the functions performed in response to reading any one of these codes from memory will be better understood hereafter, some brief remarks will be made with respect to each of these control codes at this time.

The position code is utilized to indicate to the display apparatus that the codes stored in the following two memory locations are coordinate codes respectively expressing the Y and X coordinates of the location on the cathode ray tube face to which the electron beam should be deflected. In response to recognition of the position code and the subsequent Y and X coordinates, the beam is deflected and also blanked. The line code also indicates to the display apparatus that Y and X coordinate codes are stored in the following two memory locations. However, the line code does not cause the electron beam in the display cathode ray tube to be blanked and consequently the resulting deflection of the beam draws a line visible on the face of the cathode ray tube.

The carriage return code is utilized in the representation of lines of alphanumeric data for the purpose of causing the electron beam to be deflected from the end of a first line to the beginning of a subsequent line. Consequently, the carriage return code effectively causes the Y register, whose output controls the cathode ray tube vertical deflection means, to be decremented by a specific number of counts. The space code causes a blank or space to appear on the cathode ray tube and is normally used with alphanumeric symbol codes for creating textual information on the cathode ray tube. The end-of-message code is utilized for terminating data transfer between the computer 7 and digital unit 6. The stop code is used to protect computer generated data from being accidentally modified by the operator. That is, in order for the operator to modify existing data in the digital unit memory by use of the console keyboards, as will be seen hereafter, it is necessary that an active marker symbol be used. If the operator advances the marker into a memory location containing the stop code, the marker will either be advanced to the next higher memory location containing the underline symbol or, if no underline symbol exists between the stop code and the end-of-memory, the marker will be deleted. The plot code produces a specified symbol (a spot) on the cathode ray tube at a position specified by coordinates identified by the cursor apparatus.

Various control operations are initiable by the system operator by actuation of keys of the control keyboard 14. Certain of the operations initiated in response to the actuation of a control key can be performed immediately after termination of the display cycle during which the key was actuated. Other control operations require that any marker stored in the digital unit memory be located prior to the initiation of the operation. Still other control operations require that the location in memory following the last memry location in which a word is written be found before the operation can be performed.

The control keyboard includes 20 keys (including the "marker" keys on the alphanumeric keyboard), each coupled to a different one of switches SW01 through SW20 (FIG. 3). In the particular embodiment described herein, the switches SW01–SW20 control the following operations in the apparatus, and may be so labeled:

SW01—CURSOR MODE
SW02—CHANGE LINE SEGMENT
SW03—CLEAR MEMORY
SW04—CURSOR X ONLY
SW05—CURSOR Y ONLY
SW06—CLEAR ALARM
SW07—CLEAR BLINK
SW08—DELETE LINE SEGMENT
SW09—DELETE WORD
SW10—DELETE LINE TEXT
SW11—CLEAR MEMORY TEST
SW12—COPY WORD
SW13—COPY LINE TEXT
SW14—ADVANCE MARKER
SW15—BACKSPACE MARKER
SW16—DELETE MARKER
SW17—ALPHANUMERIC INPUT
SW18—CREATE MARKER
SW19—DRAW LINE SEGMENT
SW20—CREATE PLOT SYMBOL

The switches SW01–SW20 are of the momentary closure type such that, when any one of the keys is actuated, the switch associated therewith closes momentarily and then reopens. That is, regardless of how long the key is actually depressed, the switch associated therewith will close only momentarily. Each of the switches SW01 through SW20 is connected to the input of an associated AND gate 20. The second input to each AND gate 20 is connected to the output of an OR gate 22 to whose input are applied various signals representing "not ready" conditions, as would be generated in the event that transients initiated by prior operations had not yet died out. The output of each of the AND gates 20 is connected to the set input terminal of a different conventional set-reset flip-flop FK01 through FK20. It is pointed out that unless otherwise indicated, all of the flip-flops to be discussed herein utilize conventional set-reset circuitry. The terminal extending from the left side of the box representing the flip-flop constitutes the flip-flop set input terminal and the terminal extending from the right side, the reset input terminal. The true and false flip-flop output terminals respectively extend from the left and right sides of the upper surface of the flip-flop box.

The true output terminal of each of flip-flops FK01 through FK11 is connected to the input of a different one of AND gates 24. A second input to each of the AND gates 24 is derived from the true output terminal of flip-flop FD03 which comprises one stage of a display cycle state counter which will be specifically described hereinafter. When flip-flop FD03 is true, display cycle state 4 is defined which indicates that the display cycle is ending and a keyboard cycle can be initiated. The output of each of the AND gates 24 is connected to the input of an OR gate 26. The output of OR gate 26 is connected to the set input terminal of a logic flip-flop FL1. The output of an OR gate 28 is directly connected to the reset input terminal of flip-flop FL1 and to the reset input terminals of each of flip-flops FK01 through FK11. The output of OR gate 28 is additionally connected to the input of each of OR gates 29 whose outputs are respectively coupled to the reset input terminals of flip-flops KF12–FK17, FK19 and FK20. Inputs to the OR gate 28 are derived from sources of terminating signals which are supplied in response to the termination of each of the keyboard cycles initiated in response to the actuation of one of the control keys. A second input to each of OR gates 29 connected to flip-flops FK12 through FK17 is derived from the output of an AND gate 31 which becomes true at the end of a display cycle in response to a memory address register, i.e., the R register, containing the maximum memory address, i.e., $R_{max}$, when the marker flip-flop FMKR is false. Flip-flop FMKR will be false at the end of a display cycle if no marker code is stored in memory. The output of gate 31 is also connected to the input of an AND gate 33 which is enabled whenever the light gun flip-flop FLG is true. The output of gate 33 is connected to the input of the gate 29 whose output is connected to the reset input terminal of flip-flop FK18. The output of an AND gate 35, which becomes true at the end of a display cycle whenever a logic flip-flop FL2 is false, is connected to the inputs of gates 29 whose outputs are connected to the reset input terminals of flip-flops FK19 and FK20. The output of gate 35 is also connected to the input of AND gate 37 which is enabled whenever the flip-flop FLG is false. The output of gate 37 is connected to the input of the gate 29 whose output is connected to the reset input terminal of flip-flop FK18.

The true output terminal of each of flip-flops FK12 through FK17 is connected to the input of an OR gate 30. The true output terminal of flip-flop FK18 is connected to the input of AND gate 32 whose output is also connected to the input of OR gate 30. The true output terminal of light gun flip-flop FLG is connected to the input of AND gate 32. The output of OR gate 30 is connected to the input of AND gate 34 along with the true output terminal of flip-flop FMKR. The output of gate 34 is connected to the input of OR gate 26 and to the display cycle state counter. When the output of gate 34 becomes true the display cycle state counter is forced to an all 0's state in which it can remain until a subsequent display cycle is initiated.

The true output terminals of flip-flops FK19 and FK20 are connected to the input of OR gate 36 along with the output of AND gate 38. Inputs to the AND gate 38 comprise the true output terminal of flip-flop FK18 and the false output terminal of the previously mentioned light gun flip-flop FLG. The output of OR gate 36 is connected to the input of AND gate 40 along with the output of AND gate 42. AND gate 42 provides a true output signal at the end of a display cycle if flip-flop FL2 is true meaning that the address of the memory location following the last address in which a word is written, was located during the display cycle. Henceforth, this location which follows the last location in which a word is written will be referred to as the last written address plus one or merely as $LWA+1$. The output of gate 40 is connected to the input of OR gate 26.

Figure 4:
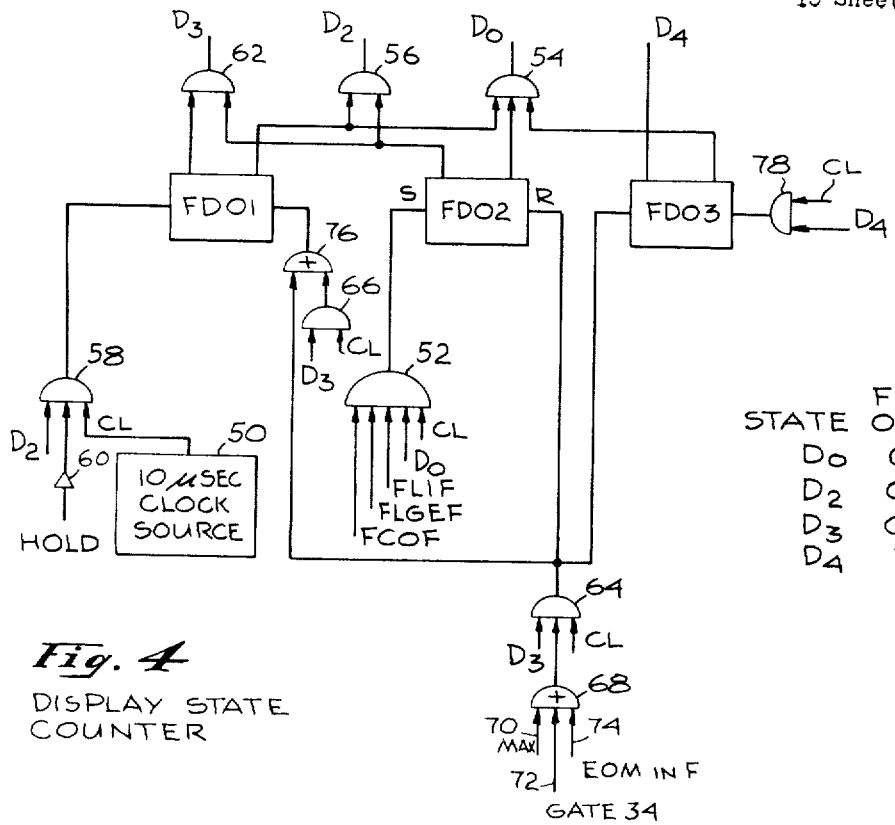
FIG. 4 is a diagram of a display state counter embodied in the apparatus.

Attention is now called to FIG. 4, which illustrates the display cycle state counter including flip-flop stages FD01, FD02, and FD03. The table in FIG. 4 illustrates the states defined by each of the flip-flops for each display cycle state. As will be seen in the discussion of FIG. 5 to follow, during display cycle state $D_2$, information is read from the digital memory, and during display cycle state $D_3$ information is written back into the digital memory. It is pointed out that the digital memory referred to herein is assumed to be a random access destructive readout memory of, e.g., the single aperture magnetic core type. The operation of this type of memory generally requires that subsequent to each reading operation, there be a restoring or writing operation to reset the states of the magnetic cores which states were obliterated during the read operation. Although this type of memory has been assumed, it is in no way to be understood that the inventive teachings herein depend upon the type of memory utilized. Thus, for example, a random access non-destructive readout memory or a non-random access non-destructive readout memory could be equally as well employed.

A source 50 of periodically generated clock pulses spaced by a fixed interval, nominally 10 microseconds, is provided. The output of the source 50 is coupled to the input of each of the gates whose outputs are connected to the display cycle state counter flip-flops so that the counter is capable of changing state only in synchronism with the pulses provided by the source 50. The display cycle state counter counts in a fixed sequence starting with state $D_0$. From state $D_0$ the counter switches to state $D_2$ for the purpose of reading the initial word from the digital unit memory. Thence, the counter switches to state $D_3$ in order to write back the information into the memory and thence to state $D_2$ to read the subsequent word from memory. The counter switches between states $D_2$ and $D_3$ until a terminal memory address is reached or until some other condition is met, as, for example, the marker stored in memory is located. In response to encountering a terminating condition, the display cycle counter switches from state $D_3$ to state $D_4$ and thence to state $D_0$. The display cycle will then begin again by assuming state $D_2$ if no other functions are to be performed.

More particularly, note that in order to switch from state $D_0$ to state $D_2$, flip-flop FD02 has to be set. Connected to the set input terminal of flip-flop FD02 is the output of AND gate 52. The output of decoding gate 54 providing a true signal representative of state $D_0$ is connected to the input of gate 52 along with the output of clock source 50. In addition, the false output terminal of previously mentioned logic flip-flop FL1 is connected to the input of gate 52. Logic flip-flop FL1 will be true when a keyboard cycle is to be initiated and consequently, when it is true, the display cycle state counter is held in state $D_0$. Alternatively, when either the light gun enable flip-flop FLGE or the computer cycle flip-flop FCO is true, the display cycle counter is held in state $D_0$. The light gun enable flip-flop FLGE is true whenever it is selectively set by the operator. Once flip-flop FLGE is set, the operator can light gun a symbol on the cathode ray tube face which sets the light gun flip-flop FLG, and causes the address of the memory location storing the light gunned symbol to be held in an S register. The flip-flop FCO will be true whenever the computer 14 signals that it is ready to modify the contents of the digital unit memory. When all of the inputs to gate 52 are true, that is to say when there is no reason to hold the display cycle counter in state $D_0$, flip-flop FD02 is set to thereby define state $D_2$. State $D_2$ is decoded by AND gate 56 whose output is connected to the input of AND gate 58 along with the output of clock source 50 and a "hold" line derived from the apparatus (gate 150) of FIG. 5 and applied to gate 58 through inverter 60. Whenever the hold line is true, the gate 58 is disabled and consequently the display cycle counter remains in state $D_2$. On the other hand, when the hold line is false, the display cycle state counter remains in state $D_2$ for only one clock period.

State $D_3$ is decoded by AND gate 62. The output of AND gate 62 is connected to the input of both AND gates 64 and 66. The output of clock source 50 is also connected to the inputs of both gates 64 and 66. The output of OR gate 68 is connected to the input of AND gate 64. Three inputs to the OR gate 68 are provided, each respectively responsive to a different terminating condition for presenting a true signal. More particularly, conductor 70 connected to the input of gate 68 provides a true output signal (via gate 210 of FIG. 5) whenever the address of the last accessed memory location corresponds to a maximum address established in accordance with a designated one of several possible criteria. The conductor 72 is provided with a true signal derived from gate 34 of FIG. 3 in response to a marker being located in the digital memory whenever a marker is being sought for purposes of performing one of the keyboard cycles. Conductor 74 is made true (via terminal 186 of decoder circuit 180 of FIG. 5) in response to an end-of-message (EOM) code being sensed in the F register, i.e. the data register of the digital memory. The output of gate 64 is connected to the set input terminal of flip-flop FD03, to the reset input terminal of flip-flop FD02, and through OR gate 76 to the reset input terminal of flip-flop FD01. The output of AND gate 66 is connected to the input of OR gate.

When the flip-flop FD03 is true, display cycle counter state $D_4$ is defined. The true output terminal of flip-flop FD03 is connected to the input of AND gate 78 along with the output of clock source 50. Consequently, the initial clock pulse generated after state $D_4$ is defined switches the display cycle state counter to state $D_0$.

Attention is now called to FIG. 5 which illustrates the digital unit apparatus active during the display cycle for reading the contents of the digital memory and for providing appropriate signals for causing the cathode ray tube to display symbols represented by the stored digital symbol codes in positions designated by the stored digital control codes. The figures subsequent to FIG. 5 up to FIG. 27 illustrate portions of the digital unit apparatus operative during each of the possible keyboard cycles which the system operator can selectively initiate.

Associated with the memory 100 in FIG. 5 is an R register 102 which is an address register whose contents identify a particular location in the memory 100, and an F register 104 which serves to store data read from and to be written into the memory location identified by the address in the R register 102. An AND gate 106 couples the output of the memory 100 to the input of the F register and an AND gate 108 couples the output of the F register to the input of the memory 100. Gate 106 is enabled during state $D_2$ of the display cycle counter and gate 108 is enabled during state $D_3$. All but one bit of the output of the F register is coupled to the input of an AND gate 110 whose output is coupled to the input of an A register 111. Gate 110 is enabled during state $D_2$ of the display cycle counter. The one bit not coupled through the gate 110 is transferred through other means to be hereafter described. The entire output of the A register is connected to the input of an AND gate 112 whose output is connected to the input of a B register 113. Also connected to the input of AND gate 112 is the output of an inverter 114 whose input is connected to the output of an OR gate 116. The AND gate 112 is enabled during state $D_2$ of the display cycle counter. The output of the B register is connected to a symbol generator 118 in the console for displaying symbols represented by the symbol codes appearing in the B register. The output of the B register is in addition connected to a decoding circuit 120 which functions to recognize control codes in the B register. More particularly, the decoder circuit 120 is provided with output conductors 124, 126, and 128 which are respectively made true in response to a position code, a line code, and a carriage return code appearing in the B register. The conductors 124, 126, and 128 are all connected to the input of an OR gate 130 whose output is connected to the input of an AND gate 132. A second input to the AND gate 132 is derived from the output of the A register 111. Third and fourth inputs to gate 132 are derived from the false output terminals of flip-flops FL4 and FL5 to be discussed hereinafter. The output of the AND gate 132 is applied to the input of a Y register 134.

Conductors 124 and 126 are applied to the input of an OR gate 136 whose output is connected to the input of an AND gate 138 along with the output of the F register 104. Third and fourth inputs to gate 138 are derived from the false output terminals of flip-flops FL4 and FL5 to be discussed hereinafter. The output of gate 138 is connected to the input of an X register 140.

The output of the OR gate 136 is additionally connected to the input of an AND gate 142 which is enabled during state $D_2$ of the display cycle. The output of gate 142 is connected to the set input terminal of a logic flip-flop FL4 and to the input of an AND gate 144. The true output terminal of the flip-flop FL4 is connected to the input of an AND gate 146 which is enabled during state $D_2$ of the display cycle. The output of AND gate 146 is connected directly to the reset input terminal of flip-flop FL4 and to the input of an OR gate 148 along with the conductor 128. The output of gate 148 is connected to the set input terminal of a flip-flop FL5. The false output terminals of both flip-flops FL4 and FL5 are connected to the input of AND gate 144 whose output is connected to the input of OR gate 116. The true output terminal of flip-flop FL4 is connected directly to the input of OR gate 116. The true output terminal of flip-flop FL5 is connected to the input of an AND gate 150 whose output is connected to the input of OR gate 116. Additional inputs to the AND gate 150 comprise the false output terminal of a position flip-flop FPOS which is true when the electron beam in the cathode ray tube is in the position designated by the coordinate contents of the X and Y registers 140 and 134, respectively, and the output of gate 56 of FIG. 4 representing state $D_2$. The output of gate 150 comprises the hold line previously referred to which is connected to the inverter 60 of FIG. 4. The true output terminal of flip-flop FL5 is connected to the input of an AND gate 152 whose output is connected to the reset input terminal of flip-flop FL5. In addition, the output of gate 56 of FIG. 4 and the true output terminal of the position flip-flop FPOS are connected to the input of the gate 152.

The conductors 124, 126, and 128 are all connected to the input of OR gate 160 whose output is connected to an electron beam X sweep generator 162 in the console. In addition, the output of OR gate 160 is connected to the input of a delay multivibrator 164 which is switched true for a certain interval, nominally 40 microseconds, in response to gate 160 providing a true output signal. The false output terminal of the delay multivibrator 164 is connected to the input of AND gate 166 whose output is connected to the set input terminal of the position flip-flop FPOS. A second input to the AND gate 166 comprises a conductor 167 connected to the console which develops a true signal whenever the electron beam actually is in position. This will be later described in connection with the analog circuitry of FIG. 27. The output of gate 166 is also connected through an inverter 168 to the reset input terminal of the flip-flop FPOS.

When the output of the gate 160 is true, in response to either a position code, a line code or a carriage return code appearing in the B register 113, the electron beam sweep circuit is turned off and remains off so long as one of those codes is in the B register. The electron beam is deflected to a position defined by the coordinate codes transferred from the F and A registers to the X and Y registers.

As will be later described in more detail, the electron beam in the display cathode ray tube is normally blanked and is unblanked in the process of creating symbols or drawing lines. In order to accomplish the latter function, the conductor 126, which develops a true signal in response to a line code appearing in the B register, is connected to one input of an AND gate 170 in the cathode ray tube unblanking circuitry. When the code in the B register is a position code or a carriage return code, the beam unblank circuit is not turned on, so that the beam is blanked while it is being repositioned. However, when a line code is in the B register, the beam is unblanked thereby causing it to trace a line on the cathode ray tube face. In any event, whenever the sweep circuit 162 is turned off by the gate 160, flip-flop FPOS is reset for at least 40 microseconds. In the event that the beam does not move into position within that 40 microseconds, the flip-flop FPOS remains reset until the beam moves into position as evidenced by a true signal being provided on conductor 167.

The R register 102 is incremented during every display cycle state $D_2$ if the electron beam of the cathode ray tube is in position as evidenced by flip-flop FPOS being true. The incrementing of the R register is controlled by AND gate 176. In the course of the display cycle during each state $D_2$, the contents of a different memory location are transferred from the memory 100 to the F register 104. During the next state $D_2$, the contents of a new location are transferred into the F register and the contents of the F register are transferred to the A register. During the next state $D_2$, the contents of the F and A registers are respectively shifted into the A and B registers and the contents of a subsequent location is read into the F register. Whenever a position code or a line code is stored in the memory, Y and X coordinate codes are stored in the immediately subsequent memory locations. The recognition of a position code or line code in the B register therefore causes the contents of the A register to be transferred to the Y register through gate 132 and the contents of the F register to be transferred to the X register through gate 138. Whenever a carriage return code is represented in the memory, a Y coordinate follows it and consequently when the carriage return conductor 128 of the decoder circuit 120 is made true in response to the carriage return code being stored in the B register, only the contents of the A register are transferred into the Y register. Transfer from the A and F registers to the Y and X registers is prevented whenever either flip-flop FL4 or FL5 is true as a consequence of connecting the false output terminals of these flip-flops to gates 132 and 138.

The Y and X registers 134 and 140 are connected to the deflection circuits of the cathode ray tube. As previously indicated, the presence of a position code, line code, or carriage return code in the B register causes the electron beam to be deflected to the coordinates designated by the contents of the Y and X registers 134 and 140. During the time the beam is being repositioned, the contents of two memory locations following the locations storing the coordinate codes can be accessed from the memory 100 and stored in the F and A registers. However, if it takes longer than two memory read-write times for the electron beam to reposition, further accessing of the memory 100 must be halted until the beam is repositioned and the contents of the A register can be transferred to the B register. The flip-flops FL4 and FL5 serve to define these two memory read-write times. That is, during the state $D_2$ in which the position or line codes are recognized in the B register, the flip-flop FL4 is set and further transfer from the A to the B register is inhibited by the signal developed by gate 142 and applied through gates 144, 116, and inverter 114 to gate 112. During the next state $D_2$, flip-flop FL4 is reset and flip-flop FL5 is set. The true output terminal of flip-flop FL4 applied through gate 116 again inhibits transfer between registers A and B. During these two memory read-write times, the contents of two subsequent memory locations were read into the F and A registers. If the beam is not yet in position, it now becomes necessary to prevent further accessing of the memory 100. This function is accomplished by gate 150 which acts to hold state $D_2$ if flip-flop FL5 is true while the position flip-flop FPOS is still false. The flip-flop FL5 is reset in response to the flip-flop FPOS being set.

Holding the position code or line code in the B register for two memory read-write times permits two subsequent codes to be read from memory into the F and A registers. In the event that a carriage return code is in the B register, it can be held therein for only one read-write time while the content of a subsequent memory location is being read from memory. Consequently, since the carriage return code is held in the B register for only one read-write time, the conductor 128 derived from the decoder circuit 120 is connected to the input of OR gate 148. In response to a carriage return code in the B register, the flip-flop FL5 is directly set and the setting of flip-flop FL4 is avoided.

A decoder circuit 180 is connected to the output of the F register and is provided with a plurality of output terminals, each of which is made true in response to a different code being stored in the F register. More particularly, conductor 182 is made true whenever an all 0's code, comprising the contents of a blank location, is stored in the F register. A conductor 184 is made true in response to any code being stored in a register which is not an all 0's code. Conductor 186 is made true whenever an end-of-message (EOM) code is sensed in the F register. Conductor 188 is made true whenever a carriage return code is sensed in the F register, and conductor 190 is made true whenever a marker code is sensed in the F register. Similarly, conductors 192, 194, 196 and 198 are respectively made true whenever a position code, a space code, a line code, and a stop code are sensed in the F register.

An AND gate 200 is provided whose output is connected to the input of an S register 202. One of the inputs to the gate 200 is derived from the output of the R register 102. The gate 200 is enabled during every display cycle state $D_3$ whenever a logic flip-flop FL2 is false, and the output of gate 203, applied to the input of gate 200 through inverter 204, is false, and the light gun flip-flop FLG is false. When gate 200 is enabled, it functions to transfer the address in the R register to the S register. The flip-flop FL2 is controlled by the conductors 182 and 184 connected to the decoder circuit 180. The conductor 182 is connected to the set input terminal of the flip-flop FL2 while the conductor 184 is connected to the reset input terminal thereof. Consequently, for so long as anything but a blank all 0's code is in the F register and assuming the outputs of gate 203 and flip-flop FLG are false, the address in the R register is transferred into the S register during each state $D_3$. However, whenever an all 0's code is sensed in the F register, then the contents of the S register are held. In this manner, the $(LWA+1)$ can be located in the memory. That is, after a blank location is accessed, its address will be transferred into the S register during the following state $D_3$ and will represent the $LWA+1$ unless a subsequent memory location is not blank. If there is a subsequent filled memory location, the flip-flop FL2 will be reset inasmuch as conductor 184 will be made true during state $D_2$ and consequently R to S register transfers will be initiated again.

The carriage return code conductor 188 is connected both to the set input terminal of a flip-flop FCR and to the input of gate 203 along with the true output terminal of flip-flop FCR. The true output terminal of flip-flop FCR is also connected to the input of AND gate 205 together with the output of gate 62 of FIG. 4 representing state $D_3$. The output of gate 205 is connected to the reset input terminal of flip-flop FCR. As a consequence of the flip-flop FCR and its associated gates, the recognition of a carriage return code in the F register prevents transfer between the R and S registers for two memory read-write times. As will be seen later, this transfer prevention is essential to the performance of the BACKSPACE MARKER operation to be described in conjunction with FIG. 20(a).

The marker code conductor 190 is connected to the set input terminal of previously mentioned flip-flop FMKR. The true output terminal of flip-flop FMKR is connected to the input of a gate 206 which is enabled during state $D_3$. The output of gate 206 is connected to the reset input terminal of flip-flop FMKR.

In addition to the switches thus far mentioned, the console is provided with three other keys known as Page A, Page B and $R_{max}$ keys which actuate corresponding switches. The Page A and Page B keys are so connected mechanically that only one at a time can be actuated. When the Page A switch is closed, the contents of only the first half of the memory are displayed, that is, the contents of address locations 0020 through 3777, if an EOM code is not first encountered. When the Page B switch is closed, the contents of address locations 4000 through 7777 or until an EOM is encountered. If the $R_{max}$ switch is closed, the contents of the entire memory will be displayed. If an EOM code is found in the first half of the memory, the display will skip to the beginning of the second half (address 4000) and start again. Of course, the display will stop when an EOM code is found in the second half of memory.

A decoder circuit 207 is connected to the output of the R register 102. The decoder circuit 207 is provided with two output terminals, each responsive to a different maximum address stored in the R register and each connected to the input of different AND gates 208 and 209. The previously mentioned Page A and Page B console keys can be selectively actuated by the operator and each controls a conductor respectively coupled to the inputs of AND gates 208 and 209. That is, when the Page A key is actuated, the gate 208 is enabled so that when a first maximum address appears in the R register, gate 208 will provide a true output signal through OR gate 210. The output of OR gate 210 comprises the maximum signal applied to the input of gate 68 discussed with reference to FIG. 4. Similarly, if the Page B key is actuated, then gate 210 will provide a true output signal when a second maximum address is stored in the R register. It should also at this point be noted that the conductor 186 derived from the decoder circuit 180 is utilized to sense the end-of-message code in the F register and is consequently connected to the conductor 74 coupled to the input of gate 68 in FIG. 4.

In various modes of operation of the apparatus to be described with reference to subsequent figures, it will be assumed as an initial condition that the address of a light-gunned symbol or line coordinate is stored in the S register 202. That is accomplished by means of the light gun enable flip-flop FLGE and the light gun flip-flop FLG, both shown in FIG. 5. The set terminal of the flip-flop FLGE is connected to one contact of a single-pole double-throw switch 222 through an AND gate 224, which is enabled during display cycle state $D_0$. The other contact of the switch 222 is connected directly to the reset terminal of the flip-flop FLGE. The switch 222, which is spring-loaded so that the upper contact is normally energized, is the switch previously mentioned as being mounted on the light gun and actuated by the operator to enable the light gun. The true output terminal of flip-flop FLGE is connected to one input terminal of an AND gate 226, whose output is connected to the set terminal of flip-flop FLG. The other input to the AND gate 226 is from a photocell in the light gun, shown diagrammatically as a switch 228. Both the output of the AND gate 224 and the false terminal of flip-flop FLGE are connected as inputs to an AND gate 230, whose output is connected through an OR gate 232 to the reset terminal of flip-flop FLG.

As previously described, the false terminal of the flip-flop FLG is connected to AND gate 200, so that when flip-flop FLG is true AND gate 200 is disabled and further transfer of addresses from the R register to the S register is prevented. After the switch 222 has been closed and flip-flop FLGE goes true during state $D_0$, the AND gate 226 is enabled and flip-flop FLG will be set true by the first pulse received from the light gun photocell 228. This action disables the AND gate 200 so that the last address transferred to the S register remains there. The last address transferred to the S register, however, is that of the second symbol subsequent to the one that has been light gunned. Therefore, it is necessary to decrement the address in the S register by two. This is accomplished by a counter 234 having "0" and "1" outputs, which are supplied to an OR gate 236. The output of the gate 236 is provided as one input to an AND gate 238 whose other input is from the true output of flip-flop FLG. The output of AND gate 238 is utilized to set the counter 234 and to decrement the S register by two when the flip-flop FLG goes true in response to a symbol being light gunned. The counter 234 is reset by the output of the OR gate 232 at the same time flip-flop FLG is reset.

When the operator releases the switch 222 and it returns to the position shown, the light gun enable flip-flop FLGE will be reset. However, the flip-flop FLG will not be reset, and the address of the light-gunned symbol will remain in the S register. The flip-flop FLG will be reset if the operator actuates the switch 222 again in order to light gun a different symbol. Similarly, the flip-flop FLG wil be reset in response to various keyboard state signals, to be later described, supplied to the OR gate 232.

When a symbol or line is light gunned, it is caused to blink on and off in the display in order to show the operator unmistakably which symbol has been light gunned. Symbols can also be caused to blink under control of the computer. This is done by adding a 1 bit to the regular 6 bit code. If the computer commands the symbol to blink, it sends the extra 1 bit to the memory 100, where it is stored along with the symbol code. If the symbol is to blink because it has been light gunned, the extra bit is inserted subsequent to the F register, so that the blink bit is not stored in memory.

The means for inserting the blink bit comprises AND gates 240 and 242, an OR gate 244 and an oscillator 246. Each of the AND gates 240, 242, has four inputs. The inputs to AND gate 240 are from the oscillator 246, the false output of light gun flip-flop FLG, display cycle state $D_2$, and the blink bit position in the F register. The inputs to the AND gate 242 are from the oscillator 246, the true output of flip-flop FLG, cycle state $D_2$, and from a compare circuit 248 that compares the contents of the R and S registers and provides an output signal when they are equal or identical. Thus, the compare circuit provides an output signal when the address in the R register is the same as that held in the S register, namely, the address of a light-gunned symbol.

The oscillator 246 may be a conventional, free running, square wave device that oscillates at a frequency of, for example, 0.2 cycle per second. Of course, the frequency of the oscillator determines the frequency of blinking of a light-gunned symbol or line and may be any desired frequency. If a blink bit is stored in memory and hence is transferred to the F register, it will be transferred to the A register and hence on to the B register only when the AND gate 240 is enabled. This occurs when no other symbol or line has been light gunned (flip-flop FLG is false), and the output of the oscillator 246 is true. Thus, as a symbol is repetitively transferred to the B register for display, it will sometimes carry with it a blink bit and sometimes it will not.

If a blank bit is added to a symbol code as a result of the symbol being light gunned, the bit is put in through the AND gate 242 rather than through the AND gate 240. In that case, the bit is inserted only when the light gun flip-flop FLG is true, the output of the address compare circuit 248 is true, and the output of the oscillator 246 is true. Thus, as in the case previously discussed, the blink bit is sometimes present in the B register along with the symbol code and sometimes it is not present.

When a blink bit is present in the B register along with a symbol or control code, the symbol or line is blanked on the cathode ray tube, even though the symbol or line is electronically generated. This will be later explained with reference to FIG. 27.

Figure 6:
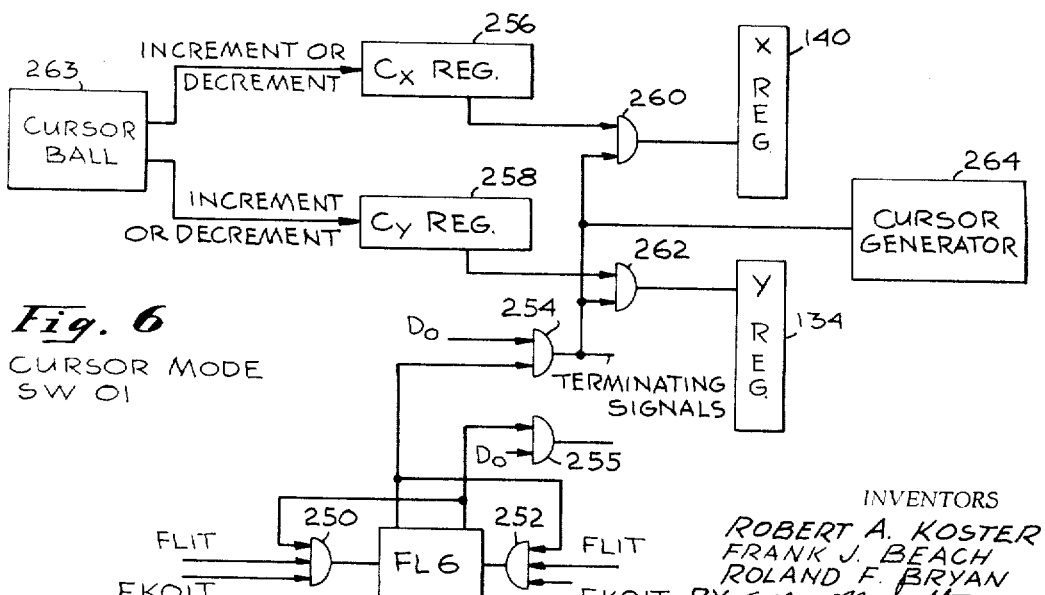
FIG. 6 is a diagram of the logic circuitry involved in a create cursor mode of operation.

FIGS. 6 through 26 illustrate the portions of the digital unit apparatus which are active in response to the actuation of each of the switches SW01 through SW20 which it will be recalled are closed in response to the operator selectively actuating a control key. FIG. 6 illustrates the apparatus active in response to the actuation of switch SW01 which is the CURSOR MODE switch. In response to the closure of the switch, the flip-flop FK01 is immediately made true and the flip-flop FL1, as shown in FIG. 3, is switched true during display cycle state $D_4$. The true output terminals of flip-flops FL1 and FK01 are applied to the input of an AND gate 250 whose output is connected to the set input terminal of a flip-flop FL6. The false output terminal of flip-flop FL6 is also connected to the input of AND gate 250. The output of an AND gate 252 is connected to the reset input terminal of flip-flop FL6. The true output terminals of flip-flop FL1, FK01, and FL6 are connected to the input of AND gate 252. Assuming the flip-flop FL6 to be initially in a false state, closure of the switch SW01 will cause the flip-flop FL6 to be set during the subsequent state $D_4$. The true and false output terminals of flip-flop FL6 are respectively connected to the inputs of AND gates 254 and 255 along with the output of gate 54 of FIG. 4 representing state $D_0$. The outputs of gates 254 and 255 are utilized as terminating signals and consequently are applied to the input of OR gate 28 of FIG. 3 to reset flip-flops FL1 and FK01. In adidtion, the output of gate 254 is employed to transfer information from $C_x$ and $C_y$ registers 256 and 258 to the X and Y registers 140 and 134, respectively, through AND gates 260 and 262. The contents of the $C_x$ and $C_y$ registers 256 and 258 are controlled by a manually movable cursor ball 263 which functions to resolve any physical movements thereof into X and Y components. For each unit movement in the X and Y direction, the $C_x$ and $C_y$ registers are accordingly incremented or decremented, as the case may be. The output of gate 254 is further used to operate a cursor generator 264, which will be described later with reference to FIG. 27. The cursor ball and its method of operation are fully described in patent application Ser. No. 334,358, filed by Robert A. Koster and assigned to the assignee of the present invention.

Summarily, in response to the closure of switch SW01, flip-flop FL6 will be made true to define a CURSOR MODE and in response to the subsequent state $D_0$, a cursor symbol will be generated and displayed on the console at a position determined by the contents of the X and Y registers 140 and 134. The contents of the X and Y registers, of course, are determined by the counts in the $C_x$ and $C_y$ registers 256 and 258 which are established in response to the operator's control of the cursor ball. Although the flips-flops FL1 and FK01 will be reset in response to the generation of a terminating signal thereby permitting further display cycles, flip-flop FL6 will remain true and consequently the cursor symbol will be displayed during each state $D_0$ until the switch SW01 is again actuated, at which time the flip-flop FL6 will be reset to terminate the CURSOR MODE. While in the CURSOR MODE, the cursor is continually displayed and the operator is able to move it to any position on the face of the display cathode ray tube by moving the cursor ball.

In FIG. 6 the true output terminals of flip-flops FK01 and FL1 are shown as inputs to certain gates therein. In the figures to follow, the true output terminals of the flip-flop FL1 and the flip-flop associated with the actuated switch will not, for simplicity sake, be shown as provided to the gate inputs but it is to be understood that the gates illustrated in each of the figures, unless otherwise indicated, are active only in response to the true states of the flip-flop associated with the closed control switch and the flip-flop FL1. In several of the operations to be henceforth described, a sequence of operational steps performed in a definite order is required. For this purpose, the states of a keyboard cycle state counter (not shown) will be referred to. The keyboard cycle state counter will normally count successively and any branch situations will be specifically referred to. Again for simplicity sake, operational steps which do not actually enter into the functional operation being described, but are only necessary due to circuit considerations, will often times not be mentioned. For example, although it is appreciated that the random access destructive readout core memory assumed to be utilized herein requires that a write operation be performed after every read operation, the following description will assume that these considerations are automatically taken into account, and will not be specifically mentioned. Thus, the description of an operation may appear to include successive operational steps, both of which involve reading from the memory and it should be understood that in actuality a write step would be incorporated therebetween.

Figure 7:
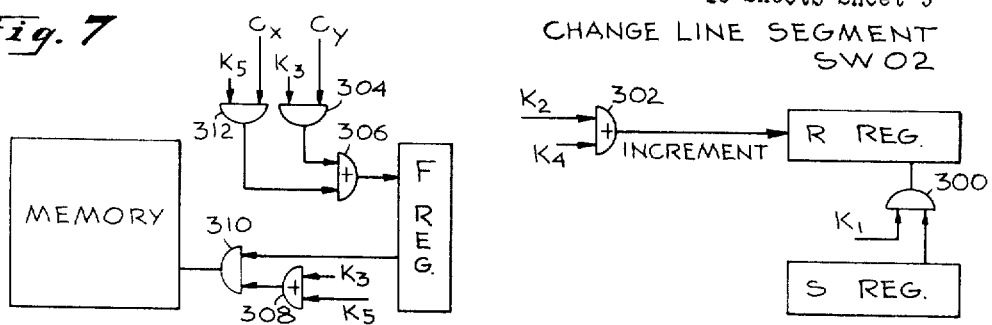
FIG. 7 is a diagram of the logic circuitry involved in a change line segment operation.

FIG. 7 illustrates the CHANGE LINE SEGMENT mode of operation. The switch SW02 is the change line segment swtich and when it is closed by the operator, after a line segment has been light gunned and if the apparatus is in the CURSOR MODE, it will cause the Y and X coordinates of the terminating point of the light-gunned line to be replaced by the Y and X coordinates of the cursor location. In response to the prior light gun operation, the memory address of the line code for the light-gunned line is held in the S register. The initial operational step requires that the address in the S register be transferred to the R register. This operational step is represented by state $K_1$ of the keyboard cycle state counter. The transfer is effected through gate 300 whose output is connected to the input of the R register. Connected to the inputs of gate 300 are the output of the S register and the conductor representing state $K_1$. In a subsequent keyboard cycle state, i.e. $K_2$, the R counter is incremented by a signal applied through OR gate 302. A subsequent operational step performed during the state $K_3$ causes the contents of the $C_y$ register 258 to be transferred through AND gate 304 and OR gate 306 into the F register. Also during state $K_3$, OR gate 308 becomes true which enables AND gate 310 causing the contents of the F register to be written into the memory. Thus, the contents of the $C_y$ counter 258 are written into the memory in the location immediately after the location storing the line code of the light-gunned line. In other words, the cursor Y coordinate replaces the Y coordinate of the line termination point. The cursor X coordinate is operated upon to similarly replace the line termination point X coordinate. That is, during state $K_4$ the R counter is again incremented. During state $K_5$ the contents of the $C_x$ register are transferred through AND gate 312 and OR gate 306 into the F register and written into the memory. During state $K_6$ a terminating signal is generated which is applied to the OR gate 28 of FIG. 3 to terminate the CHANGE LINE SEGMENT operation.

Figure 8:
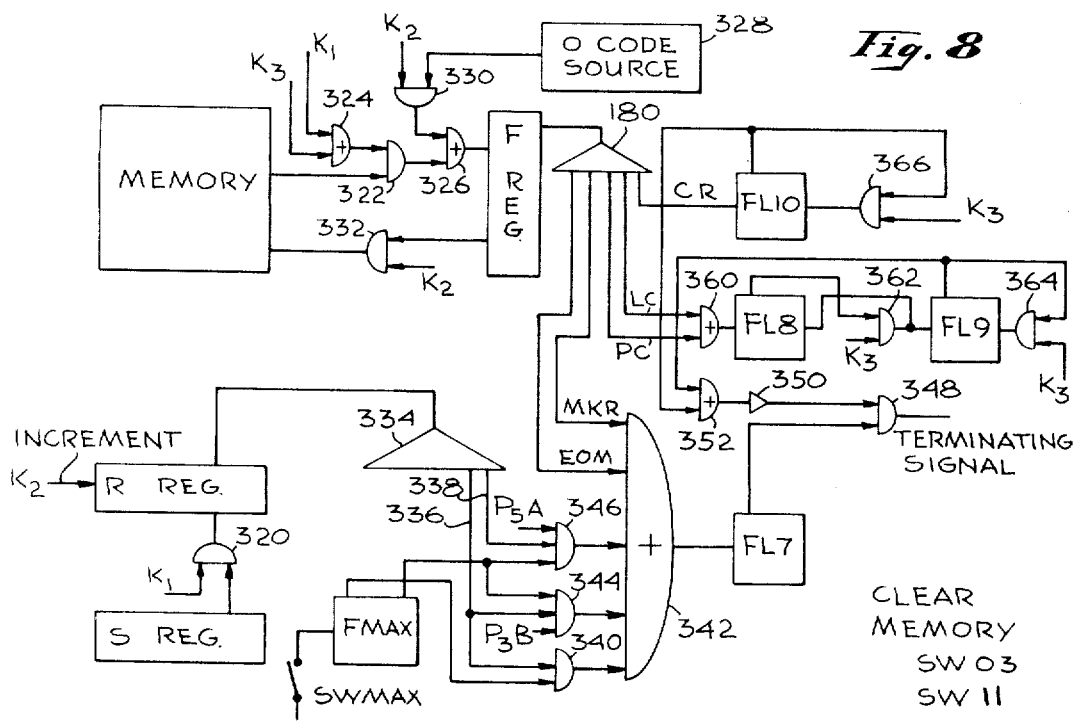
FIG. 8 is a diagram of the logic circuitry involved in a clear memory operation.

Attention is now called to FIG. 8, which describes the CLEAR MEMORY operation initiated in response to the actuation of both switches SW03 and SW11. Switch SW03 is the CLEAR MEMORY switch and switch SW11 is the MEMORY CLEAR TEST switch. It is again pointed out that the same keyboard cycle states or K states do not cause the same operational steps to be performed in the different operations. For example, the states $K_1$ do not cause the same register transfers or other operational steps responsive to the closure of switch SW02 as are caused in response to the closure of switch SW03. Inasmuch as the true output terminals of the flip-flops set in response to the closure of the switches have been assumed as being coupled to the input of the gates in their respective figures, each sequence of operational steps is unique to the provided gates. The keyboard cycle state counter merely serves to sequence in a proper order the operational steps in each control operation. It is recognized that in an actual embodiment of the invention, considerable logical simplification could be introduced by time sharing various gates which perform the same functions in different control operations. However, for the sake of clarity in understanding the description herein, the time sharing of gates from one control operation to another has been purposefully minimized.

The CLEAR MEMORY operation is performed in order to erase, or clear, any part of the digital memory. Clearing takes place only in the active memory and the active memory is defined by limiting addresses which addresses can be specified by the operator activating appropriate switches. The starting address of the active memory is stored in the S register and this address can represent a light gun address which can be entered into the S register by setting the light gun enable flip-flop FLGE and then actuating the light gun to set flpi-flop FLG. If flip-flop FLG is true, then the address in the S register is a light gun address. If the flip-flop FLG is false and the Page A switch or the switch SWMAX, connected to the set input terminal of the flip-flop FMAX, is closed, then the address stored in the S register is the first address in the first half of the memory, which address will be assumed to be 0020, in octal notation. If, on the other hand, both flip-flops FLG and FMAX are false and the Page B switch is closed, then the address in the S register is the first address in the second half of the memory, e.g. 4000, again in octal notation.

The initial operational step is to cause the contents of the S register to be transferred to the R register and this is done in response to state $K_1$, the transfer being effected through AND gate 320. The memory is also read during state $K_1$ inasmuch as AND gate 322 is enabled as a result of OR gate 324 providing a true output signal. The output of AND gate 322 is connected to the input of OR gate 326 whose output is connected to the input terminal of the F register.

During state $K_2$, an all 0's code is entered into the F register and written into memory. The output terminal of a 0's code source 328 is connected to the input of gate 330 which is enabled during state $K_2$. The output of gate 330 is connected to the input of OR gate 326. The output of the F register is connected to the input of AND gate 332 which is also enabled during state $K_2$. The output of gate 332 is connected to the memory. Consequently, during state $K_2$ the first location in the active memory is cleared. Additionally, the R counter is incremented. During state $K_3$, the memory location identified by the incremented address in the R register is read and subsequently during state $K_2$ an all 0's code is read into that memory location. Thereafter, states $K_2$ and $K_3$ are alternately defined until a terminating condition is reached. A terminating condition is reached when, if flip-flop FMAX is true, or if the Page B switch is actuated, the address in the R register is equal to the maximum memory address, i.e. 7777.

A decoder circuit 334 provided with a pair of output terminals 336 and 338 is connected to the output of the R register. Output terminal 336 is made true in response to the maximum memory address, i.e., 7777, appearing in the R register and output terminal 338 is made true in response to the maximum address in the first half of the memory, i.e., 3777, appearing in the R register. The true output terminal of the flip-flop FMAX and the terminal 336 are connected to the input of an AND gate 340 whose output is connected to the input of OR gate 342. The conductor which is made true in response to the Page B switch being closed is connected to the input of an AND gate 344 along with the decoder circuit output terminal 336 and the false ouput terminal of flip-flop FMAX. The conductor made true in response to the closure of the Page A switch is connected to the input of an AND gate 346 along with the decoder output terminal 338 and the false output terminal of flip-flop FMAX. Thus, it will be seen that gates 340, 344, and 346 provide a true input signal to OR gate 342 whenever a maximum limiting address, as defined by the Page A, Page B, and SWMAX switches is sensed in the R register.

The output of the OR gate 342 is connected to the set input terminal of a flip-flop FL7. The true output terminal of the flip-flop FL7 is connected to the input of an AND gate 348 which when enabled, generates a terminating signal for the gate 28 of FIG. 3. A second input to the gate 348 is derived from an inverter 350 whose input is connected to the output of an OR gate 352. When a carriage return code, a position code, or a line code is sensed in the F register, the keyboard cycle should not be terminated immediately but should be extended so that any coordinates in memory associated with these codes are also cleared. For this purpose, a pair of flip-flops FL8 and FL9 are provided to count two memory read-write cycles when a position or line code is sensed in the F register. As noted in connection with FIG. 5, the decoding circuit 180 is connected to the output of the F register. The line and position code output terminals of the decoding circuit 180 are connected to the input of an OR gate 360 whose output is connected to the set input terminal of the flip-flop FL8. The true output terminal of the flip-flop FL8 is connected to the input of an AND gate 362 which is enabled during state $K_3$. The output of AND gate 362 is connected to the set input terminal of the flip-flop FL9. The true output terminal of the flip-flop FL9 is connected to the input of the previously mentioned OR gate 352. Similarly, the carriage return output terminal of the decoding circuit 180 is connected to the set input terminal of a flip-flop FL10 whose true output terminal is connected to the input of OR gate 352. Both flip-flops FL9 and FL10 are reset one read-write memory cycle after they have been set true by gates 364 and 366, respectively. Flip-flop FL8 can be reset by the output of gate 362.

Two other conditions which cause terminations of the clear memory operation are that an end-of-message code is sensed in the F register or that a marker is sensed in the F register. In order to implement these conditions, the marker and end-of-message output terminals of the decoding circuit 180 are coupled to the input of OR gate 342. Thus, the means for clearing the contents of the active memory and the means for defining the limits of the active memory should now be readily understood.

Figure 9:
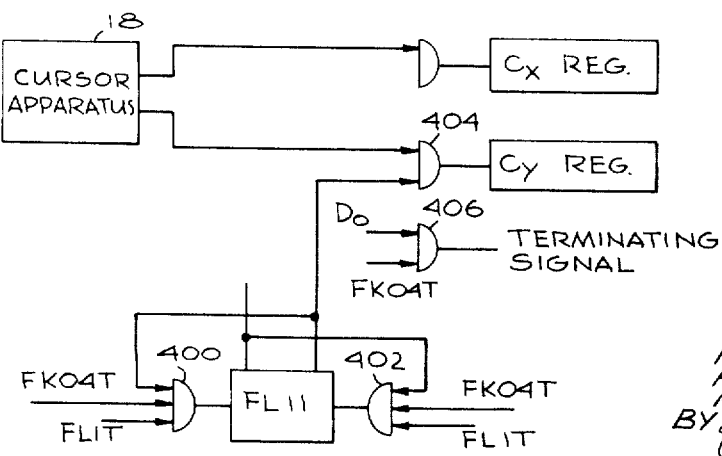

The switch SW04 comprises a CURSOR X ONLY switch and is utilized when the system is in the cursor mode, it being recalled that the cursor mode is defined by flip-flop FL6 of FIG. 6 being true. Actuation of the CURSOR X ONLY switch inhibits coupling between the cursor ball and the $C_y$ register so that spurious Y coordinate count pulses generated while moving the cursor ball in the X direction are not coupled to the $C_y$ register. The apparatus responsive to the actuation of the switch SW04 is illustrated in FIG. 9. A logic flip-flop FL11 is provided which has its set input terminal connected to the output of an AND gate 400 and its reset input terminal connected to the output of an AND gate 402. Connected to the input of AND gate 400 are the true output terminals of flip-flops FK04 and FL1 and the false output terminal of flip-flop FL11. Connected to the inputs of AND gate 402 are the true output terminals of flip-flops FL1, FK04, and FL11. The false output terminal of flip-flop FL11 is connected to the input of an AND gate 404 which couples the output of the cursor ball apparatus to the input of the $C_y$ register. Consequently, so long as the flip-flop FL11 is true, output signals provided by the cursor ball are not applied to the register $C_y$. In response to an initial actuation of the switch SW04, the flip-flop FL11 will be set during display cycle state $D_4$. During the subsequent display cycle state $D_0$, a terminating signal will be developed by an AND gate 406 which it will be recalled acts to reset the flip-flops FK04 and FL1. The flip-flop FL11, of course, will remain true so that subsequent cursor ball movement will effect only the $C_x$ register. When the switch SW04 is again actuated, the flip-flop FL11 will be reset to again couple the output of the cursor ball to the register $C_y$.

Switch SW05 constitutes a CURSOR Y ONLY switch and the apparatus responsive to the actuation thereof is illustrated in FIG. 10. Actuation of the switch SW05 of course inhibits coupling between the cursor ball and the $C_x$ register, so as to prevent spurious generated pulses from being provided thereto when it is merely desired to move the cursor along a straight line in the Y direction. The elements of FIG. 10 are directly analogous to the elements of FIG. 8, that is, AND gates 410 and 412 are provided whose outputs are respectively coupled to the set and reset input terminals of a logic flip-flop FL12. The true output terminals of flip-flops FK05 and FL1 are connected to the inputs of both AND gates 410 and 412. The true output terminal of flip-flop FL12 is connected to the input of AND gate 412 and the false output terminal of flip-flop FL12 is connected to the input of AND gate 410. The false output terminal of flip-flop FL12 is in addition coupled to the input of an AND gate 414 coupling the output of the cursor ball apparatus to the $C_x$ register. An AND gate 418 is provided for developing a terminating signal for resetting flip-flops FK05 and FL1 when display cycle state $D_0$ is defined subsequent to the setting of the flip-flop FK05 during state $D_4$.

The switch SW06 constitutes a CLEAR ALARM switch and is utilized to reset an alarm flip-flop FL13, shown in FIGURE 11. The alarm flip-flop FL13 can be set in response to any one of several alarm conditions such as parity errors or overflows developed in the manipulation of data by the computer or by any one of several other means. The actuation of switch SW06 resets flip-flop FL13 through an AND gate 420. The flip-flop FK06 is reset during display cycle state $D_0$ by the output signal developed by an AND gate 422.

Figure 12:
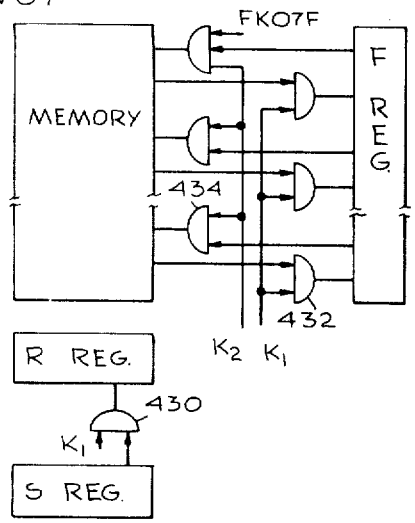
FIG. 12 is a diagram of the logic circuitry involved in a clear blink mode of operation.

The switch SW07 comprises a CLEAR BLINK BIT switch. It will be recalled that it has been assumed that each of the different symbols which the display apparatus is capable of displaying can be represented by a different six bit code. It also has been pointed out that along with each six bit code, certain other control bits are provided so that in actuality nine bit words are stored in memory and transferred to the F, A, and B registers. The ninth bit in each word constitutes a blink bit such that when it is true, the visual presentation by the display device of the symbol represented by the associated six bit code blinks. The switch SW07 enables the operator to stop the symbol from blinking after he has identified the memory address of the symbol by the utilization of the light gun. Referring now to FIG. 12, as an initial condition, it will be assumed that the address of the light-gunned symbol is stored in the S register. The first operational step in the CLEAR BLINK BIT operation requires the transfer of the contents of the S register to the R register and this is accomplished by the utilization of an AND gate 430 which is enabled during state $K_1$ of the keyboard cycle state counter. Additionally during state $K_1$, the contents of the memory location identified by the address transferred from the S to the R register are read through AND gates 432 into the F register. During state $K_2$, the contents of the F register are written back into the memory through AND gate 434. The false output terminal of flip-flop FK07 is connected to the input of AND gate 434 connected to the ninth stages of the F register and the memory. Consequently, so long as flip-flop FK07 is true (it of course being set true by the initial actuation of switch SW07), a "1" bit is not read back into the memory and consequently during subsequent display cycles in which the symbol represented by the code is displayed, it will not blink. Subsequently, during state $K_3$ a terminating signal is provided to gate 28 of FIGURE 3.

Figure 13:
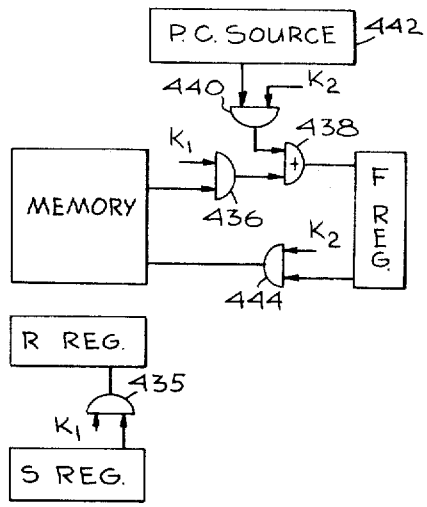
FIG. 13 is a diagram of the logic circuitry involved in a delete line segment mode of operation.

FIG. 13 illustrates the apparatus responsive to the actuation of the DELETE LINE SEGMENT switch SW08. Actuation of the switch SW08 causes the line code of a light-gunned line to be replaced by a position code. This in turn causes the display cathode ray tube electron beam to be blanked during the display interval for drawing that line. As an initial condition, it is assumed that the address of the line code of the light-gunned line is stored in the S register. During state $K_1$, the contents of the S register are transferred to the R register through an AND gate 435 and the contents of the identified memory location are read through an AND gate 436 and an OR gate 438 into the F register. During state $K_2$ the F register is set to the position code by signals provided by an AND gate 440. The output of a position code source 442 is connected to the input of the AND gate 440 which is enabled during state $K_2$. The output of AND gate 440 is connected to the input of gate 438. Also during state $K_2$, the contents of the F register are transferred through gate 444 and written into the memory at the location identified by the address stored in the R register. Subsequently, during state $K_3$ a terminating signal is provided to reset flip-flops FK08 and FL1.

FIG. 14 illustrates the apparatus responsive to the actuation of the DELETE WORD switch SW09. If the first character in a word displayed by the cathode ray tube is light gunned and the switch SW09 is actuated, the light-gunned character and all of the characters following it will be deleted until one of the following codes is encountered:

(1) space code
(2) stop code
(3) EOM code
(4) carriage return code
(5) position code
(6) line code.

Upon termination of the operation by a space code, or carriage return code, the first character of the next word is written into location 0016 of the memory as the next light-gunned address and the flip-flop FLG is left true to define the light gun mode. However, if termination of the operation is caused by a position, line, EOM or stop code, then the light gun mode is reset. If a position, line, EOM, or stop code is accessed from the memory during the operation and sensed in the F register, it is written back into memory and the operation is then terminated. If a carriage return code is sensed in the F register, it is written back into memory but the operation continues so that the light-gunned address which is thereafter entered into location 0016 of the memory may be incremented past the Y coordinate following the carriage return code. If any other code is entered into the F register, the location from which that code was accessed is cleared to all 0's.

Assume initially that the flip-flop FLG is true defining the light gun mode and that the address of the light-gunned first character in a word to be deleted is stored in the S register. In state $K_1$, the address contents of the S register are transferred into the R register through gate 450 and the contents of the location identified by that address are read into the F register. That is, during state $K_1$ the output of an OR gate 452 is true which enables an AND gate 454, one of whose inputs is connected to the memory. The output of gate 454 is connected to the input of the F register through an OR gate 456.

During state $K_2$, the F register is set to an all 0's code if logic flip-flops FL14 and FL15, whose function will be explained hereinafter, are false. So long as logic flip-flops FL14 and FL15 are false, the output of an OR gate 458 is true so that during state $K_2$ an AND gate 460 is enabled to permit the zero code source 328 to set an all 0's code into the F register. The contents of the F register are transferred through an AND gate 464 to the memory. AND gate 464 is enabled during state K₂ as a result of the output of an OR gate 466 being made true. During state K₂ the address in the R counter is incremented after it has been utilized to identify a memory location for reading.

State K₂ is followed by state K₃ in which the memory is read as a result of OR gate 452 becoming true and again enabling AND gate 454. States K₂ and K₃ are thereafter alternately defined until certain terminating conditions are encountered. A first terminating condition is that either the stop, EOM, position, or line code is sensed in the F register. In this event, an OR gate 470 provides a true output signal which sets logic flip-flop FL14 through OR gate 472 and resets the light gun mode flip-flop FLG. The true output terminal of flip-flop FL14 is connected to the input of an AND gate 474 which develops a terminating signal when enabled during the subsequent state K₃. It should be noted that the stop, EOM, position, or line code is read into the F register during state K₃. Flip-flop FL14 is immediately set. During the subsequent state K₂ the contents of the F register are not cleared to all 0's inasmuch as the true condition of flip-flop FL14 disables AND gate 460 inasmuch as the output of OR gate 458 will be false. The stop, EOM, position, or line code is written back into the memory through enabled AND gate 464.

In the event that a carriage return code is recognized in the F register, it is again necessary to develop a terminating signal but in this case it is first essential to let the R counter be incremented past the carriage return Y coordinate code so that it can thereafter be utilized as a light gun address. When the carriage return code is sensed in the F register the logic flip-flop FL15 is immediately set. During the subsequent state K₂ after the flip-flop FL15 is set, the carriage return code in the F register is written back into the memory and the R register is incremented to the address of the Y coordinate following the carriage return code. During the subsequent state K₃ the flip-flop FL15 is reset by the output signal provided by an AND gate 476. In addition, the output signal provided by gate 476 is coupled through an OR gate 478 to set flip-flop FL16 and through OR gate 472 to set flip-flop FL14. In the succeeding state K₂ the Y coordinate code is written back into the memory and the R counter is incremented. In the succeeding state K₃ the flip-flop FL16 is reset by the output of an AND gate 480 which also provides a terminating signal to gate 28 of FIGURE 3 to reset flip-flop FK09. In addition, during state K₃ an AND gate 482 is enabled to set the R counter to address 0016 which constitutes the address in which the active light gun address is written. Also occurring during state K₃ is a transfer of the contents from the R to both the F register through an AND gate 484 and OR gate 456 and to the S register. The contents newly entered into the F register during state K₃ are immediately written into memory inasmuch as the AND gate 464 is enabled as a result of AND gate 486 being enabled. Thus, in response to a carriage return code being sensed in the F register, both the carriage return code and the Y coordinate code following it are written back into the memory, the R counter is incremented to identify a new light gun address which constitutes the location following the location storing the Y coordinate code, and the new light gun address is entered into location 0016 of the memory.

In the event that a space code is sensed in the F register, the flip-flop FL16 is immediately set. In the subsequent state K₂ the F register is cleared so that an all 0's code replaces the space code previously stored in the memory and the R counter is incremented. During the subsequent state K₃ a terminating signal is developed and the previously referred to exchange takes place which enters the light gun address into memory location 0016.

Figure 15:
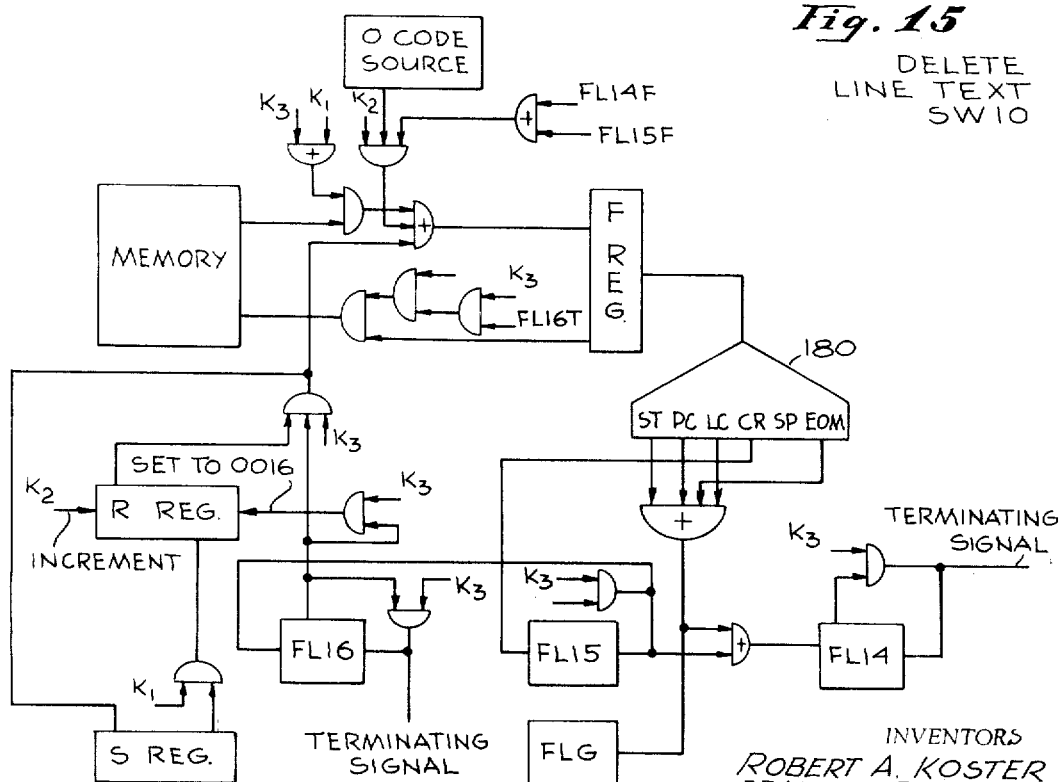
FIG. 15 is a diagram of the logic circuitry involved in a delete line text mode of operation.

Attention is now called to FIG. 15 which illustrates the apparatus responsive to the actuation of the DELETE LINE TEXT switch SW10. If the first character in a line of text is light gunned and the switch SW10 is then actuated, that character and all of the characters following it will be deleted until one of the following codes is encountered:

(1) stop code
(2) carriage return code
(3) position code
(4) line code
(5) EOM code.

Upon termination of the operation by the carriage return code, the address of the first character of the next line of text is placed into memory location 0016 and the flip-flop FLG is left true defining the light gun mode. However, if the operation is terminated by a position, line, EOM, or stop code, then the light gun mode is reset. It should be appreciated that the delete line text operation is substantially identical to the previously explained delete word operation, except for the fact that the presence of the space code in the F register is ignored when the delete line text operation is being performed.

Figure 16:
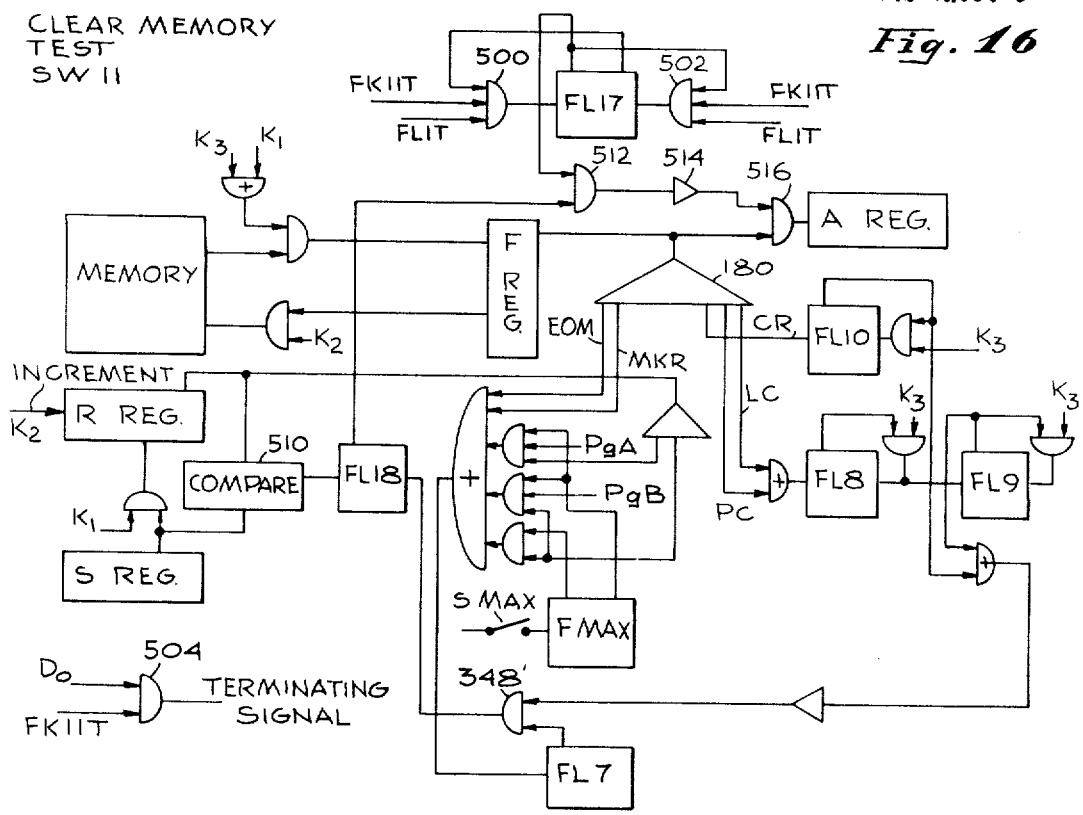
FIG. 16 is a diagram of the logic circuitry involved in a clear memory test operation.

FIG. 16 illustrates the apparatus responsive to the actuation of the CLEAR MEMORY TEST switch SW11. The switch SW11 is utilized to permit the operator to ascertain exactly how a memory clear operation will affect the visual display. Consequently, actuation of the switch SW11 inhibits data transfer from the F to the A register in every instance in which the F register would have been cleared by the apparatus active in the clear memory operation illustrated in FIG. 8. In response to the switch SW11 being actuated, the logic flip-flop FL17 is set as a result of AND gate 500 providing a true output signal. Flip-flop FL17 remains set until switch SW11 is again actuated which would result in AND gate 502 providing a true signal to the reset input terminal of flip-flop FL17. In display cycle state D₀ following the setting of flip-flop FL1, a terminating signal is generated by AND gate 504 which permits the apparatus to sequence through the display cycle. As was the case in the clear memory operation, the S register will initially store either the light gun address if operation is in the light gun mode, or the address 0020 if the Page A switch is closed or if flip-flop FMAX is true, or the S register will store address 4000 if the Page B switch is closed. In any event, the address stored in the S register initially represents the initial address in the active memory. A comparison circuit 510 continually compares the contents of the R register with the contents of the S register and sets flip-flop FL18 in response to a match situation. The true output terminal of flip-flop FL18 together with the true output terminal of flip-flop FL17 is connected to the input of an AND gate 512. The output of AND gate 512 is connected through an inverter 514 to the input of an AND gate 516. The output of the F register is connected to the input of AND gate 516 whose output is connected to the input of the A register. The AND gate 516 acts to inhibit transfer between the F and A register whenever flip-flop FL17 is true defining the clear memory test mode and flip-flop FL18 is true meaning that a portion of the active memory is being accessed during the display cycle.

Inasmuch as the clear memory test operation is provided for the purpose of enabling the operator to determine what portion of the memory will be cleared in the event that the clear memory operation is initiated, the terminating conditions for the clear memory operation are also employed in the clear memory test operation to terminate the inhibiting of the F to A register transfers. It will be recalled that the AND gate 348 in FIG. 8 was utilized to develop a terminating signal to conclude the clear memory operation. In the clear memory test operation of FIG. 17, the output of an analogous gate 348′ is utilized to reset flip-flop FL18 which in turn disables AND gate 512 and thereby permits transfers from the F to the A register. As noted, until the switch SW11 is actuated for a second time after the flip-flop FL17 is set, the system will continue to operate in a clear memory test mode which during each display cycle will prevent any information in the active memory from being displayed. It will be recalled that the lower limit address in the active memory is defined by the light gun address or by the condition of the Page A and B switches and by the flip-flop FMAX. The upper limit of the active memory is defined by the position of an EOM code, a marker code, or by the condition of the Page A and B switches and the flip-flop FMAX.

Figure 17:
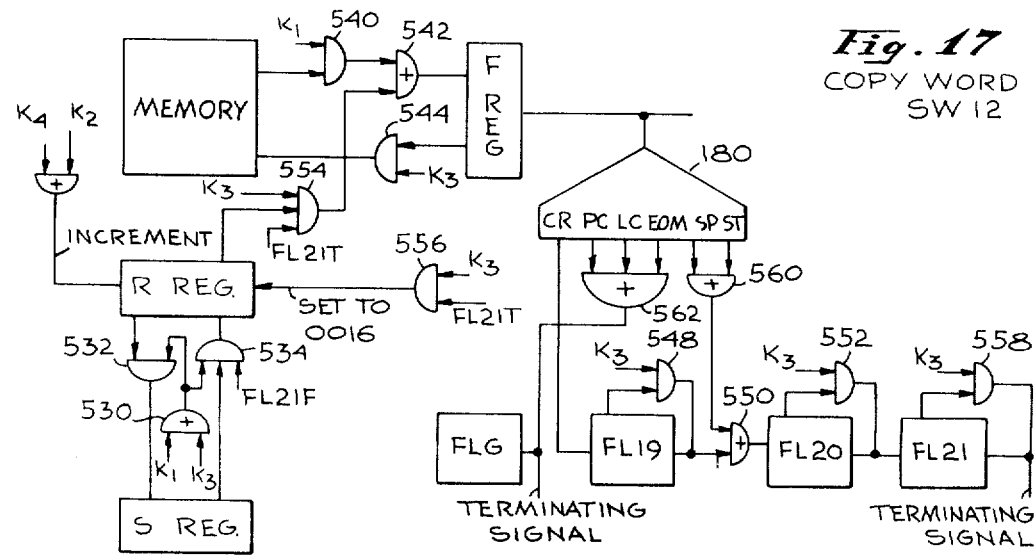
FIGS. 17 and 18 are diagrams of the logic circuitry involved in a copy word and copy line mode of operation, respectively.

It will be recalled from FIG. 3 that the actuation of each of switches SW01 through SW11 causes flip-flop FL1 to be set in response to the subsequent occurrence of display cycle state $D_4$. With respect to switches SW12 through SW17, flip-flop FL1 is not set until the marker code stored in memory is located. In addition to setting flip-flop FL1 in response to finding the marker code after one of switches SW12 through SW17 has been actuated, the display cycle state counter is immediately forced to state $D_4$. The first of the keyboard operations which requires that part of the display cycle be run through in order to find the marker is the COPY WORD operation, which is initiated by the actuation of switch SW12. The apparatus responsive to the actuation of switch SW12 is illustrated in FIG. 17. After the first character of a word has been light gunned and if a marker is present in the active memory, the word may be copied into the location specified by the marker in response to the actuation of switch SW12. The operation will transfer all of the characters of the word until one of the following codes is encountered:

(1) spaced code
(2) position code
(3) line code
(4) carriage return code
(5) EOM code
(6) stop code.

In the case of the carriage return code, the operation is continued one memory read-write cycle after the carriage return code is sensed in order to cause termination only after the Y coordinate obtained by subtracting twelve counts from the Y register has been copied into memory. With respect to the position code, the line code, and the EOM codes, the operation is terminated immediately and the flip-flop FLG is reset terminating the light gun mode. With respect to the space code and the stop code, these codes are copied back into memory and then the operation is terminated.

The apparatus of FIG. 17 initially has the marker address stored in the R register and the light gun character address stored in the S register. During state $K_1$, the contents of the S and R registers are transferred. That is, during state $K_1$ an OR gate 530 is true and enables an AND gate 532 to cause information transfer from the R to the S register. An AND gate 534 capable of transferring information from the S to the R register is also enabled if the output of logic flip-flop FL21, which will be discussed below, is false. In addition, the memory location identified by the light gun character address transferred into the R register is accessed through gate 540 into the F register. The gate 540 is enabled by the output of OR gate 542.

During the following state $K_2$ the R register is incremented. During state $K_3$ the contents of the R and S registers are again interchanged through the previously referred to gates so that the marker address is shifted into the R register. During state $K_3$ the light-gunned character code stored in the F register is transferred through gate 544 into the memory. During state $K_4$ the R register is incremented by a true signal provided by the gate 546. After state $K_4$, state $K_1$ is again defined and the system will continue to sequence in order through states $K_1$, $K_2$, $K_3$, $K_4$ and back to state $K_1$ until one of the previously mentioned codes is sensed in the F register.

If the carriage return code is sensed in the F register, the logic flip-flop FL19 is immediately set true. During the subsequent state $K_3$ the carriage return code is written back into the memory and the flip-flop FL19 is reset by the output of AND gate 548 which also sets logic flip-flop FL20 through OR gate 550. During the next state $K_1$ the Y coordinate code (obtained by subtracting 12 from the Y register count) associated with the carriage return code, is read into the F register and during the subsequent state $K_3$ the flip-flop FL20 is reset by the true signal provided by AND gate 552 which also sets the logic flip-flop FL21. During the subsequent state $K_3$, the contents of the R register which identify the memory location following the one from which the Y coordinate was accessed are transferred through AND gate 554 to OR gate 542 whose output is connected to the input of the F register. In addition, the R register is set to address 0016 by the output of AND gate 556. The contents of the F register, that is, the address of the location following the location from which the Y coordinate was accessed, is then written into the memory into address 0016 through gate 544. This address transferred into the memory is also transferred from the R register to the S register through gate 532. During state $K_3$ when flip-flop FL21 is true, the gate 558 provides an output signal which resets the flip-flop FL21 and in addition provides a terminating signal to gate 28 of FIG. 3.

When either the space or stop code is sensed in the F register, a similar procedure to that just described ensues except, however, it is not necessary to continue the operation for an additional read-write cycle time to handle the Y coordinate following the carriage return code. This extra read-write cycle time is avoided by connecting the space and stop code output terminals of the decoding circuit 180 connected to the F register to the inputs of OR gate 560, whose output is coupled to the input of an OR gate 550 which sets the flip-flop FL20. It will be recalled that the recognition of the carriage return code in the F register did not set the flip-flop FL20 directly but instead set the flip-flop FL19, which in turn caused the flip-flop FL20 to be set during the next state $K_3$.

When any one of the position, the line, or the EOM codes is recognized in the F register, the gate 562 is made true which resets the light gun flip-flop FLG to terminate the light gun mode. In addition, the output of gate 562 is applied to the gate 28 of FIG. 3 to terminate the operation.

Figure 18:
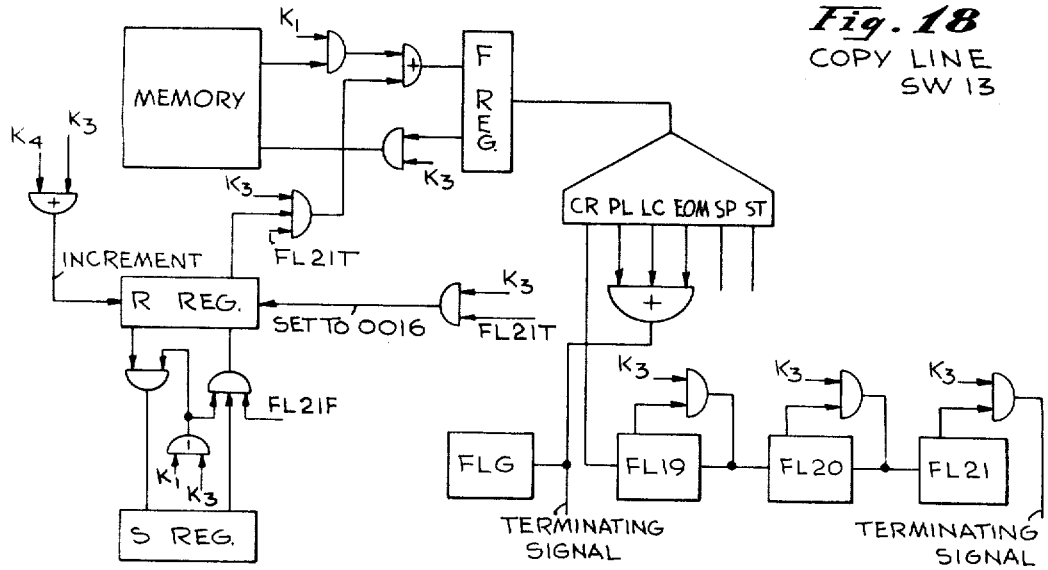

FIG. 18 illustrates the apparatus responsive to the actuation of the COPY LINE switch SW13. After the first character of a line of text has been light gunned and if a marker is present in the active memory, the line of text can be copied into the location specified by the marker by actuating the switch SW13. The ensuing operation will cause all of the characters of a line of text (including stop codes and space codes) to be copied. If a position code, line code, EOM code, or carriage return code is encountered the operation is terminated. Upon termination by a carriage return code, the first character of the next line of text is entered into the memory in location 0016 to represent the light gunned address. All codes which terminate the operation other than the carriage return code also terminate the light gun mode, that is, reset the flip-flop FLG.

The apparatus of FIG. 18 is very similar to that explained in detail with reference to FIG. 17. The one difference involves eliminating the OR gate 560 of FIG. 17. As a consequence, the recognition of either the space or the stop code does not terminate the COPY LINE operation. The space and stop codes are copied the same as any character codes. Consequently, the only code which terminates the COPY LINE operation and yet which does not terminate the light gun mode is the carriage return code.

Attention is now called to FIGS. 19(a) and (b), which respectively illustrate the apparatus responsive to the actuation of the ADVANCE MARKER switch SW14 and a flow diagram of the keyboard cycle states involved in the advance marker operation. Actuation of the advance marker switch causes the marker stored in memory to move from whatever location it is in to the immediately subsequent location, replacing the character which formerly occupied the latter location. As the marker moves out of a location, the character which it previously replaced, i.e., the former character, is retrieved from a special former character storage location and replaced in the memory location vacated by the marker. Any new former character replaced by the marker is then transferred to the special former character storage location. As the marker is advanced, the contents of the next memory location is investigated to determine whether it is a carriage return code, a position or line code, or a stop code. If a carriage return code is encountered, the marker symbol will not replace it but will jump two memory addresses in order to pass both the carriage return code and its Y coordinate. If a position or line code is encountered, the marker is deleted. If a stop code is encountered, the marker will advance past all codes except an underline code. The marker will replace the first underline code it encounters. If no underline code is encountered by the end of active memory, then the marker symbol is deleted. Thus, the underline code may be utilized by the console operator or by a computer programmer to define the end of a block of data whose beginning is defined by the stop code and cannot be altered by the console operator.

As illustrated in FIG. 19(b), the first keyboard cycle state defined in the advance marker operation is state $K_1$ in which the contents of the R register, that is the marker address, are transferred into the S register and the R register is incremented. In state $K_2$ which follows, the contents of the memory location immediately subsequent to the location in which the marker is stored are read into the F register. If a position or line code is read into the F register, a logic flip-flop FL22 is set. If a stop code is read into the F register, a logic flip-flop FL23 is set. If a carriage return code is read into the F register, a logic flip-flop FL24 is set. If any code other than a position or line code, a stop code, or a carriage return code is read into the F register, flip-flop FL25 is set.

If flip-flop FL25 is set, state $K_3$ immediately follows state $K_2$. During state $K_3$ the contents of the F register are transferred to the A register, and the marker code is set into the F register and written into the memory at the location identified by the address in the R register. If on the other hand flip-flop FL24 is true, state $K_3'$ follows state $K_2$. During state $K_3'$ the contents of the F register are written back into the memory at the location identified by the address in the R register. Subsequently, in state $K_4'$ the R register is incremented and the contents of the identified location are read. The contents, of course, comprise the Y coordinate code following the carriage return code. In addition, a logic flip-flop FL27 is set if it is false. State $K_4'$ is followed by state $K_3'$ in which the Y coordinate code is written back into the memory. In state $K_4'$ which follows, the R register is incremented again and read. This will cause the character code stored after the Y coordinate code in memory to be entered into the F register. If flip-flop FL27 is true, state $K_3$ will be defined next, in which, as previously noted, the marker code is entered into the F register and written into the memory at the location identified by the address in the R register.

If flip-flop FL23 had been set instead of flips-flops FL25 or FL24, state $K_3''$ would have followed state $K_2$. During state $K_3''$ the stop code would have been written back into memory. During state $K_4''$ which follows, the R counter is incremented and the memory is read. After state $K_4''$, state $K_3''$ will be defined until either flip-flop FL26 is set true or the maximum memory address, $R_{MAX}$, is encountered. Flip-flop FL26 will be set true when an underline code is sensed in the F register. This will cause state $K_3$ to be defined after state $K_4''$. In the event that the end of memory is reached prior to an underline code being sensed, a gate 580 will provide a terminating signal to terminate the operation.

After state $K_3$ which, as noted, will be defined if anything but a position or line code is stored in the memory location immediately subsequent to that in which the marker was originally located, state $K_4$ will be defined. Alternatively, if a position or line code was stored in the location immediately subsequent to the location in which the marker was originally found, then state $K_4$ will be defined immediately after state $K_2$.

During state $K_4$, the R register is set to location 0012 which is a special location utilized to store a displaced former character. In addition, the memory is read so that the old former character is entered into the F register. It will be recalled that during state $K_3$ the new former character was transferred from the F to the A register. During state $K_5$ the old former character is transferred from the F to the A register and the new former character is transferred from the A to the F register and written into memory location 0012. During state $K_6$, the address of the location in which the marker was found is transferred from the S to the R register and the memory read, it being recalled that this address was transferred from the R to the S register during state $K_1$. In addition, the old former character is transferred from the F to the A register and written into the memory. At the end of state $K_6$ a terminating signal is provided to gate 28 of FIG. 2.

FIG. 19(a) illustrates the portions of the digital unit apparatus which are responsive to the actuation of switch SW14 to perform the necessary transfers for accomplishing the advance marker operation. It should be noted that the gates of FIG. 19(a) are enabled during the appropriate keyboard cycle states as identified by the flow chart of FIG. 19(b). It is again pointed out that in order to facilitate the understanding of the invention herein, the true output terminals of flip-flops FK15 and FL1 responsive to the actuation of switch SW14 have been assumed as being connected to the inputs of all the gates of FIG. 19(a). It is again reiterated that in order to further facilitate an understanding of the invention herein, no attempt has been made to simplify the illustrated hardware so as to enable gates to be time shared for different operations. Such hardware reduction that would result from the time sharing of gates in the course of performing different operations is well known to those skilled in the art and to reduce the hardware illustrated herein to a minimum would, it is thought, make it very difficult to follow the sequence of operational steps performed in each operation.

Attention is now called to FIGS. 20(a) and (b), which respectively illustrate the apparatus responsive to the actuation of the BACKSPACE MARKER switch SW15 and a flow diagram illustrating the keyboard cycle states assumed in the course of performing the operation. Actuation of the BACKSPACE MARKER switch causes the marker stored in the memory to move to the immediately preceding memory location unless that previous memory location stores a stop code, the coordinate of a position or line code, or the coordinate of a carriage return code. When the marker replaces the character in the preceding location, that character is stored in memory location 0012 as the former character and the old former character is retrieved from location 0012 and entered in the location vacated by the marker. If the marker is backspaced into a stop code or into the coordinate of a position or line code, it is deleted. If the marker is backspaced into the coordinate of a carriage return code, it is inserted into the memory in the location prior to the carriage return code.

Initally, the address of the location storing the marker is stored in the R register by virtue of the apparatus of FIG. 3 which immediately halts a display cycle when a marker is accessed from the memory. The address of the memory location preceding the marker to which marker may be backspaced is stored in the S register. It will be recalled from FIG. 5 that for each memory cycle the contents of the R register are transferred to the S register except under certain conditions. One of these conditions is that a carriage return code is sensed in the F register. When a carriage return code is sensed in the F register during a display cycle, transfer from the R to the S register is inhibited for two display cycles states $D_3$.

In the performance of the backspace marker operation during keyboard cycle state $K_1$, the contents of the S and R registers are interchanged and the memory is read so that the contents of the location to which the marker may be backspaced are transferred to the F register. If the accessed contents in the F register comprises either the stop code or either the position or line code coordinate the output of OR gate 600 is made true to thereby set flip-flop FL29. The presence of a position or line code coordinate is indicated by flip-flop FL4 (FIG. 4) being true. If the accessed contents in the F register comprise any other code, then flip-flop FL28 is set.

Assuming initially that flip-flop FL28 is set, state $K_2$ will be defined subsequent to state $K_1$. During state $K_2$ the contents of the F register will be transferred to the A register through AND gate 602 enabled by OR gate 604. Also, a marker code will be entered into the F register through AND gate 606 and OR gate 608. The contents of the F register, that is, the marker code, are then written into memory at the location identified by the address in the R register. Thus, at the end of state $K_2$ the old former character will be in the A register and the marker will have been moved to its new location. Subsequently, during state $K_3$ the R register is set to address 0012 and the memory is read so that the old former character is entered into the F register. Subsequently, during state $K_4$ the contents of the F and A registers are interchanged and the new former character is entered into location 0012. Subsequently, during state $K_5$ the contents of the S register, that is the address identifying the location in which the marker was found, are transferred into the R register. The old former character is transferred from the A to the F register and written into memory.

In the event that flip-flop FL29 was set true, the marker is deleted and the stop code or position or line code coordinates are written back into memory during state $K_2'$. In state $K_3'$ which follows, the R register is set to address 0012 and the memory is read to retrieve the old former character which is entered into the F register. During state $K_4'$ the contents of the S register, i.e., the address of the location in which the marker was found, are entered into the R register and the contents of the F register are written into the memory.

Attention is now called to FIG. 21 which illustrates the apparatus responsive to the actuation of the DELETE MARKER switch SW16. Actuation of the DELETE MARKER switch SW16 causes the marker symbol to be deleted from memory and the former character stored in location 0012 to be replaced into the location from which the marker is removed. Again, as was indicated in conjunction with the backspace marker operation, as an initial condition the marker address is stored in the R register. During keyboard cycle state $K_1$, the contents of the R register are transferred through gate 620 into the S register. During state $K_2$ the R register is set to 0012 and the memory is read in order to transfer the old former character into the F register. During subsequent state $K_3$, the old former character is transferred from the F register to the A register. During state $K_4$, the address stored in the S register, that is, the address of the location in which the marker was stored, is transferred into the R register and the memory is read to thereby effectively transfer the marker code into the F register. During state $K_5$, the old former character is transferred from the A register to the F register and written into memory and the location identified by the address in the R register. During keyboard cycle state $K_6$ a terminating signal is generated and applied to gate 28 of FIG. 3.

Attention is now called to FIGS. 22(a) and (b), which respectively illustrate the apparatus active in response to the closure of ALPHANUMERIC INPUT switch SW17 and a flow diagram of the keyboard cycle states defined in the course of performing an alphanumeric input operation. It is initially pointed out that the ALPHANUMERIC INPUT switch SW17 is closed in response to actuation of any alphanumeric keyboard key. The operation functions to enter the code associated with the actuated alphanumeric key into the memory location storing the marker. The marker is then advanced into the immediately subsequent memory location unless that location contains a position, line, or stop code. If a position or line code is encountered, then the operation is terminated. If a stop code is encountered, then the marker is placed in the first memory location which contains an underline code. The new former character, that is, the character replaced in memory by the marker, is stored in memory location 0012 unless a position or line code is encountered. In the event that a carriage return code is being entered via the alphanumeric keyboard, it is destroyed if a stop code, a position code, or a line code is stored in the immediately subsequent location. If any other code is stored in the subsequent location, then the Y register is decremented by a certain number of counts, arbitrarily 12, and entered into the F register for transfer into memory. Where the location following the location in which the marker was found stores a stop code, and in the situation where a carriage return code is being entered via the alphanumeric keyboard, the carriage return code is destroyed and the marker code is entered into the next location storing an underline code. If the location after the location in which the marker code was found stores a position code or line code instead of the stop code, the carriage return code is also destroyed and the marker code is not re-entered into memory.

More particularly, consider FIG. 22(b). As in previous operations, the initial condition finds the address of the location in which the marker was found in the R register. During state $K_1$ the R register is read so that the marker code is brought into the F register. During state $K_2$ the marker code is transferred from the F register to the A register and the code provided by the alphanumeric code source is entered into the F register and written into the memory location from which the marker was extracted. In addition, the address in the R register is transferred to the S register. In the event that the code provided by the alphanumeric code source is an end-of-message code a terminating signal is immediately generated and the operation terminated. If any code other than the end-of-message code is provided by the alphanumeric code source, state $K_3$ is subsequently defined. During state $K_3$ the R register is incremented. In state $K_4$ which follows, the memory is read to thereby cause the contents of the location following the location in which the marker was found to be entered into the F register.

During state $K_2$ when the alphanumeric code source provided an input to the F register, if the input had been a carriage return code, logic flip-flop FL30 would have been set true. In the event that flip-flop FL30 is false and the contents of the F register at the end of state $K_4$ is neither a stop code, a position code, or a line code, then state $K_5$ will be defined in which the contents of the F and A registers are interchanged so that the new former character is entered into the A register and the marker code is entered into the F register and written into the location following the location in which the marker had been initially found. During the following state, $K_6$, the R register is set to address 0012 and the new former character is transferred from the A to the F register and written into memory location 0012.

In the event that the code read into the F register during state $K_4$ was a stop code and flip-flop FL30 was false, then state $K_5'$ would follow state $K_4$. During state $K_5'$ the stop code is written back into the location from which it has been extracted and the R register is incremented. Subsequently, during state $K_6'$ the memory is read. In the event that an underline code is located logic flip-flop FL31 will be set. Until logic flip-flop FL31 is set however, the keyboard cycle state counter will cycle between states $K_5'$ and $K_6'$. At the end of state $K_6'$ after an underline code has been found, the marker code is read into memory during state $K_5$ and the underline code is read into location 0012 as the former character during state $K_6$.

In the event that flip-flop FL30 is false at the end of state $K_4$ and the F register stores a position code or a line code, the position or line code is written back into memory during state $K_5''$ and a terminating signal is developed. In this event, of course, the marker is destroyed.

In the event that flip-flop FL30 was true at the end of state $K_4$ and that a code other than the stop, position, or line code was stored in the F register at the end of state $K_4$, then state $K_5'''$ is defined in which the contents of the Y register are decremented by a certain amount, arbitrarily 12, to define a Y coordinate and this quantity is entered into the F register and written into the memory location following the location into which the carriage return code was entered. During state $K_5'''$ flip-flop FL30 is reset and thereafter state $K_3$ is defined in which the R counter is incremented so that the contents of the subsequent location can be read during state $K_4$. Thereafter, any one of the previously discussed branches capable of occurring when the flip-flop FL30 is false can occur depending upon the contents of the F register.

If at the end of state $K_4$ flip-flop FL30 had been true and a stop code was stored in the F register, then the stop code is written back into memory during state $K_7$. Following, during state $K_8$, the address in the S register is transferred to the R register and all 0's code is entered into the F register which is then written into the memory to effectively erase the previously written carriage return code. After state $K_8$, state $K_5'$, previously discussed, is defined.

If, at the end of state $K_4$, flip-flop FL30 is true and a position or line code is stored in the F register, then the position or line code is written back into the memory and the carriage return code is erased from memory during state $K_8'$ by the same procedure as defined for state $K_8$. After state $K_8'$ is defined, a terminating signal is developed to terminate the operation without re-entering the marker code into any memory location.

Thus far, the operation responsive to the actuation of switches SW01 through SW17 has been discussed. It will be recalled that in response to the actuation of any one of switches SW01 through SW11, the keyboard cycle is initiated at the completion of a display cycle as indicated by the apparatus of FIG. 3. On the other hand, in response to the actuation of any one of switches SW12 through SW17, the keyboard cycle is not immediately initiated at the end of the display cycle but instead a new display cycle is initiated which continues until a marker is located in memory. If the display cycle sequences through the entire memory and no marker is located, then the keyboard cycle cannot be performed and an error light is activated to indicate this to the operator. In response to the actuation of switches SW19 and SW20, to be discussed, a full and complete display cycle is sequenced through after the actuation of each of these switches in order to locate the memory location which follows the last memory location in which any information is written. The address of the location being sought has been referred to as the last written address +1 or merely as $LWA+1$. If an $LWA+1$ does exist in memory at the end of a display cycle, i.e., when the contents of the R register equal $R_{MAX}$, then flip-flop FL2 of FIG. 5 will be true and gate 42 of FIG. 3 will be enabled. In such a case, the $LWA+1$ will be contained in the S register. If the display cycle sequences to the end of the memory and flip-flop FL2 is false, then the keyboard cycle cannot be initiated and a light is actuated to so indicate to the operator.

In response to the actuation of switch SW18, which comprises a CREATE MARKER switch, a marker code will be inserted in memory at an address identified by a light gunned address if the system is in a light gun mode, i.e. flip-flop FLG is true. If, on the other hand, the system is not in a light gun mode, then a marker code is entered into memory at the location specified by the cursor. In this latter case, the marker code is preceded by a position code and Y and X coordinate codes. The operation in which a marker is created in accordance with the light gun address will be initially considered, with reference to FIG. 23.

In response to the actuation of switch SW18 when the flip-flop FLG is true, the display cycle will be terminated when the marker is found as indicated by flip-flop FMKR being true. Termination of the display cycle under this condition causes the address of the location in which the marker was found to be contained in the R register. The light gun address is stored in the S register. With these initial conditions, the initial keyboard cycle state $K_1$ causes the old marker address to be transferred from the R to the A register through AND gate 650 and OR gate 652. Additionally, the address 0014 is entered into the R register which location can be used by the computer to ascertain where the marker was created. During state $K_2$ which follows, the light gun address contained in the S register is transferred through AND gate 654 and OR gate 656 to the F register and written into the memory location 0014 through AND gate 658 enabled by the output of OR gate 660. Subsequently, during state $K_3$ the old marker address is transferred from the A register through AND gate 662 into the R register. During state $K_4$ the old marker address is transferred from the R register to the S register through gate 664 and the light gun address or the new marker address is transferred from the S register to the R register through AND gate 666 enabled by the output of OR gate 668. During state $K_5$ the location identified by the new marker address is read to cause a new former character to be entered into the F register through AND gate 670 enabled by OR gate 672.

During state $K_6$ the marker code is set into the F register through AND gate 674 and OR gate 656 and thence written into the location identified by the new marker address in the R register. The new former character which has been stored in the F register is transferred through gate 676 enabled by the output of OR gate 678 into the A register. During state $K_7$ and R register is set to address 0012 which it will be recalled stores the old former character. The contents of location 0012 are accessed and read into the F register. During state $K_8$ the old former character is transferred from the F register to the A register and the new former character is transferred from the A to the F register and written into memory location 0012. During state $K_9$ the old marker address which had been held in the S register since state $K_4$ is transferred to the R register. Additionally, the old former character in the A register is transferred to the F register and written into the address from which it had initially been extracted. Thus, the operation causes a marker code to be entered into the memory location identified by the light gunned address and an old former character to be retrieved from memory location 0012 and returned to the memory location vacated by the marker code.

In response to the actuation of switch SW18 when the system is not in a light gun mode, as evidenced by the false condition of flip-flop FLG, a marker is created in the memory location identified by the cursor coordinates. In the performance of this operation, it is necessary to sequence through a display cycle in order to find $LWA+1$. In location $LWA+1$, a position code is entered followed in locations $LWA+2$ and $LWA+3$ by the Y coordinate and X coordinate codes. The marker code is created in location $LWA+4$. In the course of sequencing through the display cycle in order to determine the $LWA+1$, the address of the location storing the marker code is transferred from the R to the A register. This transfer is effected through gate 700 of FIG. 24 which is enabled by the output of gate 702 which is made true as soon as a marker code during the display cycle is read into the F register. The output of gate 700 is coupled directly to the input of the A register.

Consequently, as an initial condition the $LWA+1$ is stored in the S register and the address of the location storing the marker code is contained in the A register. In state $K_1$ the $LWA+1$ is transferred through gate 704 from the S to the R register, the position code is transferred through gate 706 and OR gate 708 to the F register and thence written into memory through gate 710 enabled by OR gate 712. Subsequently, during state $K_2$ the R register is incremented by a signal provided by gate 714 and in addition the contents of the $C_y$ register are transferred through gate 716 into the F register and then written into memory. During state $K_3$ the R register is again incremented and the contents of the $C_x$ register are transferred through gate 718 into the F register and thence written into memory. Thus, the position code followed by the Y cursor coordinate code and the X cursor coordinate code are respectively written into the memory locations $LWA+1$, $LWA+2$, and $LWA+3$. During state $K_4$ the R register is again incremented and during state $K_5$ the contents of the R register are transferred through gate 720 and OR gate 722 to the S register. Additionally, the R register is set to address 0014. During state $K_6$ the contents of the S register comprising the address $LWA+4$ or the address in which the marker code is going to be written, in transferred into the F register and written into memory location 0014. During state $K_7$ the contents of the F register are transferred into the R register through AND gate 724 and OR gate 726. Additionally, the marker code is entered into the F register through AND gate 728 and OR gate 708 and written into the location identified by address $LWA+4$. In state $K_8$, the R register is set to address 0012 and the old former character is read into the F register. During state $K_9$ the old marker address, which had been held in the A register since prior to state $K_1$, is transferred into the R register through gates 730 and 726 and the old former character is written from the F register into memory.

Attention is now called to FIG. 25 which illustrates the apparatus responsive to the DRAW LINE SEGMENT switch SW19. Upon the initial actuation of the switch SW19, a position code together with the cursor coordinates (i.e. as represented by the contents of the $C_y$ and $C_x$ registers) are written into the memory beginning at the location $LWA+1$. Subsequent actuations of the switch SW19 cause the line code to be entered into memory instead of the position code so that the electron beam of the display cathode ray tube is not blanked in moving from one position to another. A logic flip-flop FL32 of FIG. 25 is set by the output of AND gate 750 in response to the initial actuation of switch SW19. It remains set until it is reset by the output of OR gate 752. The inputs to OR gate 752 comprise the true output terminals of any of the flip-flops FK01 through FK20 associated with operations which would interfere with sequential line drawing. For example only, the entry of any alphanumeric symbol would interfere with sequential line drawing and consequently the true output terminal of flip-flop FK17 is connected to the input of OR gate 752.

As an initial condition in the DRAW LINE SEGMENT operation, the $LWA+1$ is contained in the S register. During state $K_1$ the $LWA+1$ is transferred from the S to the R register through gate 748 and the position code is set into the F register through OR gate 754 if AND gate 756 is enabled by a false condition of logic flip-flop FL32, while a line code is set into the F register if AND gate 758 is enabled by a true condition of flip-flop FL32. In any event, the contents of the F register are transferred into the memory location $LWA+1$ through AND gate 760 enabled by the output of OR gate 762.

During state $K_2$ the R register is incremented by a signal provided by the output of OR gate 764. During state $K_3$ the contents of the $C_y$ register are transferred through AND gate 766 and OR gate 754 into the F register and thence written into memory location $LWA+2$. During state $K_4$, the R register is again incremented and during state $K_5$ the contents of the $C_x$ register are transferred through AND gate 768 and OR gate 754 to the F register and thence written into memory location $LWA+3$. During state $K_6$ which follows, a terminating signal is developed. Thus, it should be apparent that the DRAW LINE SEGMENT operation enables appropriate codes to be automatically entered into the memory so that the display cathode ray tube will trace straight lines between end of points designated by the cursor coordinates.

FIG. 26 illustrates the apparatus responsive to the actuation of the CREATE PLOT SYMBOL switch SW20. In response to the actuation of the switch SW20, a plot symbol code is written into memory after a position code, the Y cursor coordinate code, and the X cursor coordinate code. Thus, the plot symbol is displayed at the location designated by the cursor. As an initial condition to the operation, the $LWA+1$ is stored in the S register. During state $K_1$, the $LWA+1$ is transferred through AND gate 800 from the S to the R register and a position code is transferred through AND gate 802 and OR gate 804 into the F register. The position code is then written into memory through AND gate 806 enabled by the output of OR gate 808. During state $K_2$, the R register is incremented by a signal provided by gate 810. During state $K_3$, the contents of the $C_y$ register are transferred through AND gate 812 into the F register and written into memory location $LWA+2$. During state $K_4$, the R register is incremented and during state $K_5$ the contents of the $C_x$ register are transferred through AND gate 814 and written into memory location $LWA+3$. During state $K_6$, the R register is incremented, and during state $K_7$ the plot symbol code is entered into the F register through AND gate 816 and written into memory location $LWA+4$. During state $K_8$ a terminating signal is generated.

The analog circuitry relating to the display portion of the apparatus of the invention will now be described with reference to the block diagram of FIG. 27. There are two requirements involved in the visual display of large quantities of data such as are involved in the present control/display apparatus. First, the display must be of sufficient size that the data may be easily read by the console operator. This requirement indicates that the display cathode ray tube must be of considerable size, thus involving wide angle electron beam deflection. Second, because of the great amount of data that can be displayed, in the present case as much as thirty-two lines having sixty-four symbols per line, the electron beam of the cathode ray tube must be deflected at very high frequencies. An electrostatic deflection type of cathode ray tube can meet the second requirement of high frequency operation, but cannot meet the first requirement of wide angle electron beam deflection. Conversely, an electromagnetic deflection type of cathode ray tube can meet the first requirement, but is incapable of operating at very high frequencies. This has led to the development of a cathode ray tube, such as the cathode ray tube 10, which includes both electromagnetic and electrostatic deflection means.

In the present apparatus, a low frequency gross deflection system is combined with a high frequency symbol generation deflection system. The low frequency deflection system supplies signals to an electromagnetic deflection yoke 900, while the high frequency symbol generation deflection system supplies signals to X and Y electrostatic deflection plates 901 and 902, respectively. The low frequency electromagnetic deflection system sequentially positions the electron beam of the cathode ray tube for each symbol to be generated, and the symbol generator deflection system provides high frequency signals to produce symbols at the positions to which the gross deflection system has deflected the beam. However, still another problem exists. Because of the limited frequency response of the electromagnetic deflection system, it has heretofore been necessary for the symbol generation circuits to wait after each symbol has been generated until the gross deflection system has moved the beam to the new position and all transients have died out. This time is frequency equal to the time it takes to generate a symbol, so that the symbol generator can spend only one-half of its time actually generating symbols, while the other half is wasted waiting for the gross deflection system to position the beam.

The necessity for waiting for the gross deflection system to settle down can be eliminated by providing it with an input within its frequency response capabilities. Such an input may be a smooth ramp signal to cause a continuous smooth sweep of the beam through the positions at which symbols are to be generated. The high frequency deflection system, which is capable of much faster response, may be provided with a compensating input which effectively positions the beam at the sequential symbol positions. This compensating input is added to the symbol generation signals. The input to the electromagnetic horizontal gross deflection means is thus a smooth ramp, which tends to cause the beam to sweep smoothly from left to right. The compensating input to the high frequency horizontal deflection means is a sawtooth which tends to cause the beam to sweep from right to left during the symbol generation time and return rapidly between symbols. When both of these signals influence the electron beam, the cumulative effect is to hold it steady at a gross position during a symbol generation time and then to quickly move it to the next symbol position between symbol generation times. The symbol generator thus can operate at a much higher duty cycle since repositioning of the electron beam is accomplished very rapidly.

As seen in FIG. 27, the ramp signal for the gross deflection circuitry is provided by the X sweep generator 162 previously mentioned in connection with FIG. 5. As noted in connection with that figure, the OR gate 160 provides a signal in response to either a position code, a line code or a carriage return code appearing in the B register. That signal, which is supplied to the X sweep generator 162, inhibits action of the sweep generator and causes the electron beam of the cathode ray tube to be positioned at the left-hand side of the screen. The ramp output signal from the X sweep generator 162 is amplified by a conventional X deflection amplifier 903 and supplied to the X deflection input of the electromagnetic deflection yoke 900.

As was previously mentioned, a high frequency sweep is applied to the electrostatic deflection plates of the cathode ray tube 10 which, when its action is combined with that of the electromagnetic sweep, causes the electron beam to move from left to right across the face of the cathode ray tube in stepped fashion. That high frequency sweep is generated by an X high frequency sweep generator 904 and is applied to the X or horizontal deflection plates 901 through an X summing device 905 and a conventional X deflection amplifier 906. The X high frequency sweep generator 904 is triggered by a pulse provided by the symbol generator 118 previously mentioned with reference to FIG. 5. A trigger pulse is provided by the symbol generator 118 each time a character is to be generated. The trigger pulse causes the X high frequency sweep generator 904 to generate a sawtooth signal which effectively counteracts the sweep signal being generated by the X sweep generator 162 to hold the cathode ray tube electron beam steady, so far as its gross position is concerned, while a symbol is being generated. At the end of each cycle of the output signal of the sweep generator 904, the cathode ray tube electron beam jumps to the position that it would have had had the high frequency sweep generator 904 not been energized. Inasmuch as sixty-four symbols may be positioned in one line on the cathode ray tube, sixty-four sawtooth signals may be generated by the high frequency sweep generator 904 while the X sweep generator 162 is generating one ramp signal. A suitable sweep generator arrangement is described in patent application Ser. No. 334,315, filed by Robert A. Koster and assigned to the assignee of the present invention.

The symbol generator 118, which receives its input signals from the B register 113, may be any one of a number of various types. For example, a preferred symbol generator that is known to operate satisfactorily in this application is available commercially from Straza Industries, El Cajon, Calif., and is known as model 1164. Another symbol generator that might be used is known as a VIDIAC, and is available from CBS Laboratories Div., Columbia Broadcasting System, Stamford, Conn. Still another symbol generator which might be utilized in the present apparatus is described in patent application Ser. No. 291,956, filed July 1, 1963, by Robert A. Koster, and assigned to the same assignee as the present invention. In view of the fact that such generators are well known in the art, further description of the symbol generator will be made only in functional terms.

The symbol generator 118, in addition to providing trigger signals to the X high frequency sweep generator 904, provides three other output signals. It provides a Y sweep signal to a Y summing device 907 whose output is connected to the input of a conventional Y deflection amplifier 908. The output of the Y deflection amplifier 908, of course, is connected to the Y or vertical deflection plates 902 of the cathode ray tube. The symbol generator 118 also provides an X sweep signal to the X summing device 905 so that that signal is also amplified and applied to the X or horizontal deflection plates 901 of the cathode ray tube. Another output of the symbol generator 118 is an unblanking signal which is provided to a summing device 910, whose output is connected to the input of a conventional video amplifier 911. The output of the video amplifier 911 is supplied to a control grid 912 to control unblanking of the electron beam in the cathode ray tube 10.

The Y sweep, X sweep, and unblanking output signals from the symbol generator 118 cause any one of sixty-four different symbols to be generated on the face of the cathode ray tube at positions determined by the electromagnetic gross deflection circuitry. As previously pointed out, the position in the X or horizontal direction is determined by the X sweep generator 162. There is no Y or vertical electromagnetic sweep generator, the Y position of the electron beam being determined solely by the coordinate stored in the Y register 134. The output of the Y register 134 is provided to a digital-to-analog converter 913, which acts to convert the digitally coded signals stored in the Y register to a voltage or current signal suitable for beam deflection purposes. The output of the digital-to-analog converter 913 is supplied as input to a shaping circuit 914, whose purpose will be later described in detail. The output of the shaping circuit 914 is amplified by a conventional Y deflection amplifier 915 and supplied as a Y deflection signal to the Y input of the electromagnetic yoke 900 of the cathode ray tube. Thus, the electron beam in the cathode ray tube 10 is deflected to a Y or vertical position determined by the coordinate stored in the Y register.

After the cathode ray tube electron beam is positioned under the control of the electromagnetic gross deflection circuitry, a symbol is generated by means of the electrostatic deflection circuitry and the beam unblanking circuitry. The X sweep and Y sweep output signals from the symbol generator 118 cause the electron beam of the cathode ray tube to scan over a matrix of points and to be unblanked at certain of those points to create visible symbols on the face of the tube. In the present case, the electron beam scans in zig-zag fashion over a 15 x 16 matrix of points and is unblanked at different ones of the points to create the different symbols. Of course, the sweep of the electron beam across the face of the tube and the unblanking pulses supplied to the tube must be synchronized in order to generate a meaningful symbol. Such synchronization is accomplished within the symbol generator 118. The technique for generating symbols on a matrix of points is well known in the art and is also clearly described in the previously mentioned patent application Ser. No. 291,956 of R. A. Koster. Hence, it will not further be described here.

As previously mentioned in connection with FIG. 6, a signal is provided from the gate 254 to the cursor generator 264, when the equipment is operating in the CURSOR MODE, to cause a cursor to be displayed on the face of the cathode ray tube 10 at coordinates specified by the contents of the X and Y registers. The X sweep generator 162 is disabled because of a signal being received from the gate 160 (FIG. 5) as a result of a position code being in the B register 113. When the cursor generator 264 is enabled by the signal received from the gate 254, it functions to provide Y and X sweep signals along with an unblanking signal. The cursor generator 264 generates sequential X and Y sweeps which cause the electron beam of the cathode ray tube to trace a crosshair on the face of the tube, with the crosshair being centered at the coordinates defined by the contents of the X and Y registers. An unblanking pulse is also provided by the cursor generator 264 through the summing device 910 and the video amplifier 911 to the control grid 912 of the tube 10 to unblank the beam while the cursor or crosshair is being traced. As shown, the cursor X and Y sweep signals are provided to the summing devices 905 and 907, respectively, and thence through the amplifiers 906 and 908 to the horizontal and vertical electrostatic deflection plates 901 and 902, respectively, of the cathode ray tube.

The portion of the analog circuitry of the apparatus yet to be described relates to the means for drawing straight lines between two given points on the surface of the display tube. It will be recalled that when the apparatus is operating in the DRAW LINE SEGMENT mode, a signal is provided from the OR gate 160 (FIG. 5) to disable the X sweep generator 162 so that the cathode ray tube electron beam can be positioned in accordance with the contents of the X and Y registers 140 and 134, respectively. As was previously mentioned, the contents of the Y register 134 are provided to the digital-to-analog converter 913, which converts the digital code into an analog signal. The analog signal is supplied to the Y input of the electromagnetic deflection yoke 900 through the shaping circuit 914 and the Y deflection amplifier 915. Similarly, the contents of the X register 140 are provided to a digital-to-analog converter 916 and thence through a shaping circuit 917 and the X deflection amplifier 903 to the X input of the electromagnetic deflection yoke 900. It will also be recalled that a signal is provided on the conductor 126 from the decoding circuit 120 (FIG. 5) to the AND gate 170 in the intensity control circuitry of the cathode ray tube. The signal appearing on the conductor 126 enables the AND gate 170 so that the cathode ray tube electron beam is unblanked as it moves from one point to another and its intensity during that movement is controlled by an intensity control circuit 918, which will later be described in greater detail.

In drawing a line, a first set of X and Y coordinates is converted to analog signals by the digital-to-analog converters 913 and 916 and utilized to position the electron beam of the cathode ray tube at a point corresponding to one end of a line to be drawn. The contents of the X and Y registers are then changed to define the coordinates of the other end of the line to be drawn. These new coordinates are then converted to analog signals by the digital-to-analog converters with the output signal of each converter being in the form of a step function, the height of the step depending on the differences between the numbers in the first and second sets of digital numbers supplied to the converters from the X and Y registers. If the step function output signals of the converters were used directly to energize the horizontal and vertical deflection circuits of the display tube, the deflection circuits would become saturated so that the electron beam would not move in a straight line between the two points defined by the two sets of end coordinates. Rather, the beam would first tend to be deflected from the point defined by the coordinates of the first set of signals by first forming a slope of 45 degrees with both vertical and horizontal axes of the display surface, and, after the horizontal or vertical component of the second set of end coordinates had been reached, the beam would tend to approach the point defined by the second set of coordinates in either a straight horizontal or vertical direction. Thus, two lines would be drawn between the two sets of end coordinates rather than the single desired straight line. It is the function of the shaping circuits 914 and 917 to prevent the foregoing phenomenon from occurring.

The shaping circuits 914 and 917 modify the step or square wave output signals of the digital-to-analog converters 913 and 916 to provide signals to energize the horizontal and vertical electromagnetic deflection circuits of the display tube and prevent those deflection circuits from saturating. The wave shaping circuits further control the input signals to both the X and Y deflection circuits so that the ratios between step signal increments produced by the digital-to-analog converters and the corresponding deflection signal increments supplied to the deflection circuits are substantially equal at all times. Furthermore, the signals provided to the deflection circuits change in amplitude from level to level in accordance with the step function signals in the same predetermined length of time regardless of the amplitude of the change.

Inasmuch as every line to be drawn on the surface of the display cathode ray tube is drawn in a fixed predetermined time period although the lines may differ in length, the electron beam will sweep across the display surface at varying rates, thereby causing variations in optical intensity of the various lines. However, by varying the beam intensity as a function of the rate of deflection of the beam, it is possible to increase the intensity of the electron beam whenever the rate of deflection of the beam increases. This latter function is performed by the intensity control circuitry 918 which is coupled to the outputs of the X and Y deflection amplifiers 903 and 915 and hence to the X and Y deflection yoke circuitry of the cathode ray tube.

The shaping circuits 914 and 917 may be of various types. For example, they may comprise resistance-inductance-capacitance type passive networks to shape the step function of the signals of the digital-to-analog converters. Such shaping circuits are fully described in patent application Ser. No. 298,950, filed July 31, 1963 by Martin C. Henderson, and assigned to the assignee of the present invention. Alternatively, the shaping circuits may comprise matched delay lines as described in patent application Ser. No. 298,881, filed July 31, 1963 by Martin C. Henderson and Norton B. Buck, and assigned to the assignee of the present invention. In view of the reference to the foregoing patent applications, the shaping circuits will not be described in detail herein.

The intensity control circuitry 918 may comprise various arrangements. For example, it may include a pair of difference amplifiers, with one amplifier being connected across the X-deflection coil and the other connected across the Y deflection coil. The outputs of both difference amplifiers may be connected to the input of the AND gate 170 so that the cathode ray tube control grid 912 is controlled by the rate of deflection of the electron beam in both the horizontal and vertical directions. Alternatively, the magnitudes of the output signals of the difference amplifiers may be compared and only the larger of the two signals used to control the potential of the control grid 912. In still another arrangement, the control grid may be controlled by a signal having an amplitude which is the root mean square of the output signals of the difference amplifiers. Suitable intensity control circuitry is described in detail in the previously referenced patent application Ser. No. 298,950 and hence will not be further described herein.

It is pointed out that the intensity control circuitry 918 will be effective to control the electron beam intensity only when the gate 170 is enabled by receiving a signal on the conductor 126 from the decoding circuit 120 (FIG. 5). As previously pointed out, this signal is present only in response to a line code being present in the B register 113. The output of the intensity control circuitry 918 is provided through an inverter 919 to the conductor 167, which is connected to the gate 166 whose output sets flip-flop FPOS. Thus the position flip-flop FPOS will be set only after the electron beam of the cathode ray tube has reached the position to which it is being deflected.

As was previously mentioned in connection with FIG. 5, a blink bit present in the B register causes the symbol or line that would otherwise be displayed to be blanked. The cyclic provision of the blink bit thus causes a symbol or line to blink on the display. As shown in FIG. 27, one section of the B register is connected to the input of the video amplifier 911 through an inverter 920. When a blink bit is present in the B register, the signal provided to the video amplifier 911 counteracts any unblanking signals supplied from the AND gate 170 or the summing device 910 to maintain the electron beam in a blanked state, even though it is deflected in accordance with the symbol or line that would normally be presented on the display.

It is now apparent that control/display apparatus embodying the invention fills a long-felt need for an adequate link between an operator and a digital computer. It provides control means, display means and data editing means arranged in a manner most convenient for an operator to use efficiently. Although a specific embodiment of the invention has been illustrated and described, it is apparent that many modifications may be made by one skilled in the art without departing from the true spirit and scope of the invention.

We claim:

1. Apparatus for displaying information and for controlling the information displayed, said apparatus comprising:
   a display means including a screen;
   a digital memory including a plurality of storage locations, each location being capable of storing one of a plurality of information codes, said information codes including positioining control codes, coordinate codes, and symbol codes;
   means for cyclically accessing said storage locations;
   means for applying said codes accessed from said storage locations to said display means;
   said display means being responsive to said codes applied thereto for displaying information represented thereby on said screen;
   a control means including a plurality of actuatable controls;
   means responsive to the actuation of at least one of said controls for generating coordinate codes identifying a selected position on said screen and storing said generated coordinate codes in said memory;
   means responsive to the actuation of at least one of said controls for generating a marker symbol code and storing it in said memory in association with said generated coordinate codes;
   said display means being responsive to said marker symbol code applied thereto for displaying a marker symbol on said screen at the position identified by the coordinate codes associated with said marker symbol code;
   means for selectively identifying one of said storage locations; and
   means responsive to the actuation of at least one of said controls for transferring said marker code to said identified storage location.

2. The apparatus of claim 1 including means for generating a selected information code; and
   means responsive to the actuation of one of said controls for replacing said marker code with said generated information code and for storing said marker code in a subsequent storage location.

3. The apparatus of claim 1 including means for generating a selected information code; and
   means responsive to the actuation of one of said controls for storing each succeedingly generated information code in the storage location subsequent to the storage location in which the previously generated information code was stored.

4. The apparatus of claim 3 including a memory address register and a memory readout register;
   means for periodically incrementing said memory address register to successively define addresses identifying said memory storage locations;
   means for entering said codes accessed from said storage locations into said memory readout register;
   an auxiliary memory address register;
   means transferring the address stored in said memory address register to said auxiliary memory address register prior to said memory address register being incremented; and
   means responsive to a particular code being initially entered into said memory readout register for generating an inhibiting signal;
   said means for transferring from said memory address register to said auxiliary memory address register being responsive to the generation of said inhibiting signal for inhibiting said transferring.

5. The apparatus of claim 4 including means responsive to the entry into said memory readout register of a code other than said particular code for terminating the generation of said inhibiting signal.

6. Apparatus for displaying information and for controlling the information displayed, said apparatus comprising:
   a display means including a screen;
   a digital memory including a plurality of storage locatoins, each location being capable of storing one of a plurality of information codes;
   means for cyclically accessing said storage locations;
   means for applying said codes to said display means;
   said display means being responsive to said codes applied thereto for displaying information represented thereby on said screen;
   a control means including a plurality of actuatable controls;
   means responsive to the actuation of each of said controls for modifying said information codes stored in said memory;
   means for identifying one of said storage locations;
   means for generating a selected information code;
   means for storing said generated code in said identified location;
   said means for generating selected information codes including horizontal and vertical cursor coordinate registers;
   a cursor control;
   means for respectively incrementing said horizontal and vertical cursor coordinate registers in response to each movement of said cursor control in horizontal and vertical directions; and means for displaying a cursor symbol on said screen in a position controlled by the states of said horizontal and vertical cursor coordinate registers.

7. Apparatus for presenting visual displays including a plurality of discrete symbols, said apparatus comprising:
- a cathode ray tube having a screen and a beam generating means;
- a digital memory having a plurality of storage locations;
- means for selectively generating a plurality of different symbol codes;
- means for selectively generating a position code and coordinate codes identifying any position on said screen;
- means for storing each of said selectively generated codes in said storage locations;
- means for cyclically and sequentially accessing said storage locations;
- means responsive to said position and coordinate codes being accessed for deflecting said beam to the position identified by said accessed coordinate codes;
- means responsive to each of said symbol codes being accessed for causing said beam to trace a symbol identified by said accessed symbol code; and
- means for incrementally repositioning said beam after each of said symbols is traced.

8. The apparatus of claim 7 wherein said means for deflecting said beam includes vertical and horizontal coordinate registers; and
- means for storing said accessed coordinate codes in said coordinate registers.

9. The apparatus of claim 8 wherein said means for repositioning said beam includes a ramp voltage generator; and
- means for effectively summing the output of said ramp voltage generator with the coordinate code stored in one of said coordinate registers.

10. Apparatus for presenting visual displays including a plurality of straight lines, said apparatus comprising:
- a cathode ray tube having beam generating means;
- a diagonal memory having a plurality of storage locations;
- means for selectively generating a position code and selected ones of a plurality of different coordinate codes;
- means for selectively generating a line code and selected ones of a plurality of different coordinate codes;
- means for storing each of said selectively generated codes in a different one of said storage locations;
- means for cyclically and sequentially accessing said storage locations;
- means responsive to the accessing of said position code for deflecting said beam to an initial position identified by said accessed coordinate codes generated therewith; and
- means responsive to the accessing of said line code for causing said beam to trace a line from said initial position to a position identified by said accessed coordinate codes generated therewith.

11. The apparatus of claim 10 including means for storing a position code in lieu of selected ones of said line codes.

12. Apparatus for presenting visual displays including a plurality of discrete symbols, said apparatus comprising:
- a cathode ray tube having a screen and a beam generating means;
- a digital memory having a plurality of storage locations;
- means for selectively generating a plurality of different symbol codes;
- means for storing each of said selectively generated codes in a different one of said storage locations;
- means for cyclically and sequentially accessing said storage locations;
- vertical and horizontal coordinate registers;
- means for selectively generating coordinate information identifying any position on said screen and storing said coordinate information in said coordinate registers;
- means responsive to said coordinate information stored in said coordinate registers for deflecting said beam to said identified position;
- means responsive to each of said symbol codes being accessed for causing said beam to trace a symbol identified by said accessed symbol codes; and
- means for modifying said information stored in said coordinate registers after each of said symbols is traced.

13. Apparatus for presenting visual displays including a plurality of discrete symbols, said apparatus comprising:
- a cathode ray tube having beam generating means;
- a digital memory having a plurality of storage locations;
- means for selectively generating a plurality of different symbol codes;
- means for selectively generating a position code together with selected Y and X coordinate codes;
- means for storing each of said selectively generated codes in said storage locations and for respectively storing said Y and X coordinate codes immediately following said position code;
- a memory readout register;
- first and second auxiliary registers;
- a source of successive clock pulses;
- means responsive to each successive clock pulse for accessing a succeeding storage location to read out the code stored therein into said readout register;
- means responsive to each successive clock pulse for transferring the code stored in said readout register into said first auxiliary register and the code stored in said first auxiliary register into said second auxiliary register;
- vertical and horizontal coordinate registers;
- decoding means responsive to said position code being transferred into said second auxiliary register for respectively transferring the codes stored in said first auxiliary register and said readout register into said vertical and horizontal coordinate registers; and
- means responsive to the codes stored in said vertical and horizontal registers for moving said beam to a position identified thereby.

14. The apparatus of claim 13 wherein said means for deflecting said beam includes first and second digital-to-analog converters respectively connected to said vertical and horizontal registers.

15. Apparatus for presenting visual displays including a plurality of discrete symbols, said apparatus comprising:
- a cathode ray tube having beam generating means;
- a digital memory having a plurality of storage locations;
- means for selectively generating a plurality of different symbol codes;
- means for selectively generating either a position code or a line code together with selected X and Y coordinate codes;
- means for storing each of said selectively generated codes in a different one of said storage locations and for respectively storing said Y and X coordinate codes in locations immediately following the location storing said position code or line code;
- a memory readout register;
- first and second auxiliary registers;
- a source of successive clock pulses;
- means responsive to each successive clock pulse for accessing a succeeding storage location to read out the code stored therein into said readout register;

means responsive to each successive clock pulse for transferring the code stored in said readout register into said first auxiliary register and the code stored in said first auxiliary register into said second auxiliary register;

vertical and horizontal coordinate registers;

decoding means responsive to said position code being transferred into said second auxiliary register for respectively transferring the codes stored in said first auxiliary register and said readout register into said vertical and horizontal coordinate registers;

means responsive to the codes stored in said vertical and horizontal registers for moving said beam to a position identified thereby; and means responsive to said position code being stored in said second auxiliary register for blanking said beam while it is being moved.

16. Display apparatus comprising:

a cathode ray tube having beam generating means;

a digital memory having a plurality of storage locations;

means for selectively generating a plurality of different symbol codes;

means for selectively generating a plurality of different control codes;

means for selectively generating a marker code;

means for storing each of said selectively generated codes in a different one of said storage locations;

timing means defining successive display cycles;

means active during each of said display cycles for sequentially accessing said storage locations;

means responsive to the accessing of certain ones of said control codes for moving said beam to positions identified by said control codes;

means responsive to the accessing of said symbol codes for causing said beam to trace symbols identified by said symbol codes;

a keyboard including a plurality of control keys;

means responsive to the actuation of said control keys for modifying said codes stored in said storage locations;

a vertical and a horizontal coordinate register each capable of storing a code;

means responsive to said codes stored by said vertical and horizontal coordinate registers for deflecting said beam to a position identified thereby;

first and second cursor coordinate registers;

means for storing selected codes in said first and second cursor coordinator registers; and means responsive to the actuation of one of said control keys for respectively transferring the codes stored in said first and second cursor coordinate registers to said vertical and horizontal coordinate registers and for causing said beam to trace a cursor symbol.

17. Display apparatus comprising:

a cathode ray tube having beam generating means;

a digital memory having a plurality of storage locations;

means for selectively generating a plurality of different symbol codes;

means for selectively generating a plurality of different control codes;

means for selectively generating a marker code;

means for storing each of said selectively generated codes in a different one of said storage locations;

timing means defining successive display cycles;

means active during each of said display cycles for sequentially accessing said storage locations;

means responsive to the accessing of certain ones of said control codes for moving said beam to positions identified by said control codes;

means responsive to the accessing of said symbol codes for causing said beam to trace symbols identified by said symbol codes;

a keyboard including a plurality of control keys;

means responsive to the actuation of said control keys for modifying said codes stored in said storage locations;

means responsive to certain ones of said accessed control codes for unblanking said beam while moving it to thereby cause a line to be traced and responsive to other ones of said accessed control codes for blanking said beam while moving it.

18. The apparatus of claim 17 wherein said control codes identifying beam positions comprise coordinate codes;

means for identifying memory storage locations storing selected coordinate codes;

first and second cursor coordinate registers;

means for storing selected codes in said first and second cursor coordinate registers; and means responsive to the actuation of one of said control keys for respectively transferring the codes stored in said first and second cursor coordinate registers to said identified storage locations.

19. Display apparatus comprising:

a cathode ray tube having beam generating means;

a digital memory having a plurality of storage locations;

means for selectively generating a plurality of different symbol codes;

means for selectively generating a plurality of different control codes;

means for selectively generating a marker code;

means for storing each of said selectively generated codes in a different one of said storage locations;

timing means defining successive display cycles;

means active during each of said display cycles for sequentially accessing said storage locations;

means responsive to the accessing of certain ones of said control codes for moving said beam to positions identified by said control codes;

means responsive to the accessing of said symbol codes for causing said beam to trace symbols identified by said symbol codes;

a keyboard including a plurality of control keys;

means responsive to the actuation of said control keys for modifying said codes stored in said storage locations;

means for identifying spaced first and second selected memory storage locations; and means responsive to the actuation of one of said control keys for clearing the locations between said identified first and second locations.

20. Display apparatus comprising:

a cathode ray tube having beam generating means;

a digital memory having a plurality of storage locations;

means for selectively generating a plurality of different symbol codes;

means for selectively generating a plurality of different control codes;

means for selectively generating a marker code;

means for storing each of said selectively generated codes in a different one of said storage locations;

timing means defining successive display cycles;

means active during each of said display cycles for sequentially accessing said storage locations;

means responsive to the accessing of certain ones of said control codes for moving said beam to position identified by said control codes;

means responsive to the accessing of said symbol codes for causing said beams to trace symbols identified by said symbol codes;

a keyboard including a plurality of control keys;

means responsive to the actuation of said control keys for modifying said codes stored in said storage locations;

means for identifying spaced first and second selected memory storage locations; and means responsive to the actuation of one of said control keys for inhibiting said means causing said beam to trace symbols in response to codes accessed from storage locations between said identified first and second storage locations.

21. Display apparatus comprising:

a cathode ray tube having beam generating means;

a digital memory having a plurality of storage locations;

means for selectively generating a plurality of different symbol codes;

means for selectively generating a plurality of different control codes;

means for selectively generating a marker code;

means for storing each of said selectively generated codes in a different one of said storage locations;

timing means defining successive display cycles;

means active during each of said display cycles for sequentially accessing said storage locations;

means responsive to the accessing of certain ones of said control codes for moving said beam to positions identified by said control codes;

means responsive to the accessing of said symbol codes for causing said beam to trace symbols identified by said symbol codes;

a keyboard including a plurality of control keys;

means responsive to the actuation of said control keys for modifying said codes stored in said storage locations;

means for initially identifying selected memory locations;

means responsive to the initial identification of a storage location for tagging the code therein;

a free running oscillator alternately defining first and second states; and means for blanking said beam in response to accessing a tagged stored code when said oscillator concurrently defines said first state.

22. The apparatus of claim 21 including means for subsequently identifying a memory storage location; and means responsive to the actuation of one of said control keys for inhibiting the tagging of codes in said subsequently identified location.

23. Display apparatus comprising:

a cathode ray tube having beam generating means;

a digital memory having a plurality of storage locations;

means for selectively generating a plurality of different symbol codes;

means for selectively generating a plurality of different control codes;

means for selectively generating a marker code;

means for storing each of said selectively generated codes in a different one of said storage locations;

timing means defining successive display cycles;

means active during each of said display cycles for sequentially accessing said storage locations;

means responsive to the accessing of certain ones of said control codes for moving said beam to positions identified by said control codes;

means responsive to the accessing of said symbol codes for causing said beam to trace symbols identified by said symbol codes;

a keyboard including a plurality of control keys;

means responsive to the actuation of said control keys for modifying said codes stored in said storage locations;

means for identifying spaced first and second memory storage locations and spaced third and fourth memory storage locations; and means responsive to the actuation of one of said control keys for transferring the codes stored in locations between said first and second storage locations to locations between said third and fourth storage locations.

24. Display apparatus comprising:

a cathode ray tube having beam generating means;

a digital memory having a plurality of storage locations;

means for selectively generating a plurality of different symbol codes;

means for selectively generating a plurality of different control codes;

means for selectively generating a marker code;

means for storing each of said selectively generated codes in a different one of said storage locations;

timing means defining successive display cycles;

means active during each of said display cycles for sequentially accessing said storage locations;

means responsive to the accessing of certain ones of said cnotrol codes for moving said beam to positions identified by said control codes;

means responsive ot the accessing of said symbol codes for causing said beam to trace symbols identified by said symbol codes;

a keyboard including a plurality of control keys;

means responsive to the actuation of said control keys for modifying said codes stored in said storage locations;

means for selectively generating a marker code and for storing it in one of said storage locations;

means responsive to the actuation of one of said control keys for transferring said marker code from a first location in which it is stored to an immediately adjacent location; and means for transferring the code stored in said immediately adjacent location to a dedicated location and for transferring the code stored in said dedicated location to said first location.

25. Apparatus for presenting visual displays including a plurality of discrete symbols, said apparatus comprising:

a cathode ray tube having a screen and a beam generating means;

a digital memory having a plurality of storage locations;

means for selectively generating a plurality of different symbol codes;

means for selectively generating a position code and coordinate codes identifying any position on said screen;

means for storing each of said selectively generated codes in a different one of said storage locations;

means for cyclically and sequentially accessing said storage locations;

means responsive to said position and coordinate codes being accessed for deflecting said beam to the position identified by said accessed coordinate codes;

means responsive to each of said symbol codes being accessed for causing said beam to trace a symbol identified by said accessed symbol code;

means for incrementally repositioning said beam after each of said symbols is traced;

a control means including a plurality of actuatable control keys; and means responsive to the actuation of each of said control keys for modifying said codes stored in said memory.

26. The apparatus of claim 25 including means for generating a selected information code; and means responsive to the actuation of one of said control keys for storing each succeedingly generated information code in the storage location subsequent to the storage location in which the previously generated information code was stored.

27. The apparatus of claim 26 including a memory address register and a memory readout register;

means for periodically incrementing said memory address register to successively define addresses identifying said memory storage location;

means for entering said codes accessed from said storage locations into said memory readout register;

an auxiliary memory address register;

means transferring the address stored in said memory address register to said auxiliary memory address register prior to said memory address register being incremented; and means responsive to a particular code being initially entered into said memory readout register for generating an inhibiting signal;

said means for transferring from said memory address register to said auxiliary memory address register being responsive to the generation of said inhibiting signal for inhibiting said transferring.

28. The apparatus of claim 27 including means responsive to the entry into said memory readout register of a code other than said particular code for terminating the generation of said inhibiting signal.

29. An information display system comprising:
a cathode ray tube having beam generating and deflection means;

a digital memory having a plurality of storage locations each storing a code identifying information to be displayed;

means cyclically and sequentially accessing said codes for causing said beam to display all of the information identified thereby during a single display cycle;

horizontal and vertical cursor coordinate registers;

a movable cursor control;

means for respectively incrementing said horizontal and vertical cursor coordinate registers in response to each incremental movement of said cursor control in first and second directions; and means for selectively defining a cursor display mode;

said beam deflection means being further responsive to said cursor display mode being defined for causing said beam to display a cursor symbol at a position identified by said cursor coordinate registers at least once during each display cycle.

30. An information display system comprising:
a cathode ray tube having beam generating means:

a digital memory having a plurality of storage locations each storing a code identifying information to be displayed;

means cyclically and sequentially accessing said codes from said storage locations;

beam deflection means repsonsive to said accessed codes for causing said beam to display all of the information identified thereby during a single display cycle;

means for identifying selected ones of said codes;

a free running oscillator alternately defining first and second states; and means for inhibiting said beam deflection means from displaying the information identified by said selected ones of said codes whenever said oscillator defines said first state.

References Cited
UNITED STATES PATENTS

| | | | |
|---|---|---|---|
| 2,884,619 | 4/1959 | Woodbury et al. | 340—172.5 |
| 2,938,949 | 5/1960 | Vosburgh et al. | 178—6.8 |
| 3,037,192 | 5/1962 | Everett | 340—172.5 |
| 3,248,705 | 4/1966 | Dammann et al. | 340—172.5 |
| 3,256,516 | 6/1966 | Melia et al. | 340—172.5 |

ROBERT C. BAILEY, *Primary Examiner.*

PAUL J. HENON, *Examiner.*

O. E. TODD, JR., *Assistant Examiner.*